US012042674B2

(12) United States Patent
Lee et al.

(10) Patent No.: US 12,042,674 B2
(45) Date of Patent: Jul. 23, 2024

(54) MASK APPARATUS AND METHOD FOR CONTROLLING THE SAME

(71) Applicant: LG Electronics Inc., Seoul (KR)

(72) Inventors: Keonwang Lee, Seoul (KR); Hojung Kim, Seoul (KR); Taejun Kim, Seoul (KR); Chiyoung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 807 days.

(21) Appl. No.: 17/112,500

(22) Filed: Dec. 4, 2020

(65) Prior Publication Data

US 2021/0379412 A1 Dec. 9, 2021

(30) Foreign Application Priority Data

Jun. 5, 2020 (KR) ........................ 10-2020-0068402

(51) Int. Cl.

*A62B 18/00* (2006.01)
*A62B 7/10* (2006.01)
*A62B 9/00* (2006.01)
*A62B 18/02* (2006.01)

(52) U.S. Cl.

CPC .............. *A62B 18/006* (2013.01); *A62B 9/00* (2013.01); *A62B 18/025* (2013.01); *A62B 7/10* (2013.01)

(58) Field of Classification Search

CPC ..... A62B 18/00; A62B 18/003; A62B 18/006; A62B 18/02; A62B 18/025; A62B 7/10; A62B 23/02; A61M 16/0066; A61M 16/0069; A41D 13/11; A41D 13/1176; A42B 3/286

See application file for complete search history.

(56) References Cited

U.S. PATENT DOCUMENTS

| | | | |
|---|---|---|---|
| 4,546,793 | A | 10/1985 | Stupecky |
| 4,646,732 | A | 3/1987 | Chien |
| 5,062,421 | A | 11/1991 | Burns et al. |
| 5,372,130 | A | 12/1994 | Stern et al. |
| 5,782,234 | A | 7/1998 | Bates |

(Continued)

FOREIGN PATENT DOCUMENTS

| | | |
|---|---|---|
| CN | 1455270 | 11/2003 |
| CN | 103505788 | 1/2014 |

(Continued)

OTHER PUBLICATIONS

Machine translation of CN-208145256-U.*

(Continued)

*Primary Examiner* — Joseph D. Boecker
(74) *Attorney, Agent, or Firm* — Fish & Richardson P.C.

(57) ABSTRACT

A mask apparatus includes a mask body including a body front surface and a body rear surface configured to cover at least a portion of a user's face, a fan module disposed at the body front surface, a mask body cover that is coupled to the mask body and defines an inner space accommodating the fan module, a seal coupled to the body rear surface and configured to define a breathing space between the mask body and the user's face. The mask body defines an opening that passes through the mask body and that connects the inner space of the mask body cover to the breathing space. A pressure sensor is disposed in the opening and configured to sense air pressure in the breathing space.

20 Claims, 16 Drawing Sheets

(56) References Cited

U.S. PATENT DOCUMENTS

| | | | | |
|---|---|---|---|---|
| 6,213,119 | B1 | 4/2001 | Brydon et al. | |
| 6,543,450 | B1 | 4/2003 | Flynn | |
| 8,667,959 | B2 | 3/2014 | Tilley et al. | |
| 10,226,542 | B2 | 3/2019 | Messina et al. | |
| 10,342,999 | B2 | 7/2019 | Song et al. | |
| 10,661,104 | B2 | 5/2020 | Morgan et al. | |
| 11,241,594 | B2 | 2/2022 | Szasz et al. | |
| 2003/0052279 | A1 | 3/2003 | Kikuchi | |
| 2003/0066257 | A1 | 4/2003 | Shovlin | |
| 2003/0066527 | A1 | 4/2003 | Chen | |
| 2005/0145249 | A1 | 7/2005 | Solyntjes et al. | |
| 2006/0076012 | A1 | 4/2006 | Tanizawa et al. | |
| 2007/0125385 | A1 | 6/2007 | Ho et al. | |
| 2009/0320847 | A1 | 12/2009 | Bozanic et al. | |
| 2010/0101575 | A1 | 4/2010 | Fedorko et al. | |
| 2010/0224190 | A1 | 9/2010 | Tilley et al. | |
| 2010/0313892 | A1 | 12/2010 | Shigematsu et al. | |
| 2010/0329924 | A1 | 12/2010 | Harris | |
| 2011/0126713 | A1 | 6/2011 | Legare et al. | |
| 2014/0216475 | A1 | 8/2014 | Blomberg et al. | |
| 2014/0360501 | A1 | 12/2014 | Guiducci et al. | |
| 2015/0034080 | A1* | 2/2015 | Furuichi | A62B 9/02 128/201.19 |
| 2015/0047642 | A1 | 2/2015 | Tucker et al. | |
| 2015/0136142 | A1 | 5/2015 | Blomberg | |
| 2015/0151143 | A1 | 6/2015 | Langford | |
| 2015/0202473 | A1 | 7/2015 | Curran et al. | |
| 2015/0217144 | A1 | 8/2015 | Skov et al. | |
| 2015/0217146 | A1 | 8/2015 | Skov et al. | |
| 2015/0250915 | A1 | 9/2015 | Pugh et al. | |
| 2015/0289598 | A1 | 10/2015 | Hsiung | |
| 2015/0306324 | A1* | 10/2015 | Ayon | A61M 16/0066 128/205.25 |
| 2015/0362478 | A1 | 12/2015 | Phillips | |
| 2016/0001111 | A1 | 1/2016 | Morgan et al. | |
| 2016/0022944 | A1 | 1/2016 | Chodkowski et al. | |
| 2016/0030778 | A1 | 2/2016 | Skov et al. | |
| 2016/0030779 | A1 | 2/2016 | Twu et al. | |
| 2016/0074604 | A1 | 3/2016 | Bronner et al. | |
| 2016/0236016 | A1 | 8/2016 | Ono et al. | |
| 2016/0279450 | A1 | 9/2016 | Goldstein et al. | |
| 2017/0136271 | A1 | 5/2017 | Munster | |
| 2017/0157353 | A1 | 6/2017 | Olsen et al. | |
| 2018/0078798 | A1 | 3/2018 | Fabian et al. | |
| 2018/0177965 | A1 | 6/2018 | Patel | |
| 2018/0185677 | A1* | 7/2018 | Curran | A61M 16/0066 |
| 2018/0236275 | A1 | 8/2018 | Song et al. | |
| 2018/0318457 | A1 | 11/2018 | Lucio | |
| 2019/0009114 | A1 | 1/2019 | Han | |
| 2019/0113501 | A1 | 4/2019 | Jameson et al. | |
| 2019/0160249 | A1 | 5/2019 | Rose et al. | |
| 2019/0175962 | A1 | 6/2019 | Su et al. | |
| 2019/0275357 | A1 | 9/2019 | Palmer, Jr. et al. | |
| 2020/0008539 | A1 | 1/2020 | Kolasa | |
| 2020/0038614 | A1 | 2/2020 | Duff et al. | |
| 2020/0086071 | A1 | 3/2020 | Lin et al. | |
| 2020/0087031 | A1 | 3/2020 | Yoo et al. | |
| 2020/0129650 | A1 | 4/2020 | Kim et al. | |
| 2020/0155877 | A1 | 5/2020 | Key et al. | |
| 2021/0228920 | A1 | 7/2021 | Arigue et al. | |
| 2021/0337891 | A1 | 11/2021 | Shah et al. | |
| 2021/0378325 | A1 | 12/2021 | Mun et al. | |
| 2021/0379418 | A1 | 12/2021 | Kim et al. | |
| 2021/0402222 | A1* | 12/2021 | Kwon | A62B 18/025 |
| 2022/0016449 | A1* | 1/2022 | Choi | A62B 18/08 |

FOREIGN PATENT DOCUMENTS

| | | | | |
|---|---|---|---|---|
| CN | 103751919 | | 4/2014 | |
| CN | 104162236 | | 11/2014 | |
| CN | 203943119 | | 11/2014 | |
| CN | 104826247 | | 8/2015 | |
| CN | 204637356 | | 9/2015 | |
| CN | 105126219 | | 12/2015 | |
| CN | 105167366 | | 12/2015 | |
| CN | 105476118 | | 4/2016 | |
| CN | 105495776 | | 4/2016 | |
| CN | 105641821 | | 6/2016 | |
| CN | 205285072 | | 6/2016 | |
| CN | 106039607 | | 10/2016 | |
| CN | 106235464 | | 12/2016 | |
| CN | 106253937 | | 12/2016 | |
| CN | 106730464 | | 5/2017 | |
| CN | 106847663 | | 6/2017 | |
| CN | 107149182 | | 9/2017 | |
| CN | 206459266 | | 9/2017 | |
| CN | 107224687 | | 10/2017 | |
| CN | 206577264 | | 10/2017 | |
| CN | 107308564 | | 11/2017 | |
| CN | 107405508 | | 11/2017 | |
| CN | 107735148 | | 2/2018 | |
| CN | 206995630 | | 2/2018 | |
| CN | 207011751 | | 2/2018 | |
| CN | 207040968 | | 2/2018 | |
| CN | 207041756 | | 2/2018 | |
| CN | 207152901 | | 3/2018 | |
| CN | 207604526 | | 7/2018 | |
| CN | 207721249 | | 8/2018 | |
| CN | 207836817 | | 9/2018 | |
| CN | 108635689 | | 10/2018 | |
| CN | 208145256 | | 11/2018 | |
| CN | 208145256 | U * | 11/2018 | A62B 7/10 |
| CN | 109078277 | | 12/2018 | |
| CN | 208403333 | | 1/2019 | |
| CN | 208611622 | | 3/2019 | |
| CN | 208694061 | | 4/2019 | |
| CN | 109924568 | | 6/2019 | |
| CN | 111135492 | | 5/2020 | |
| CN | 111565763 | | 8/2020 | |
| EP | 0558147 | | 9/1993 | |
| EP | 0621056 | | 10/1994 | |
| EP | 2913083 | | 9/2015 | |
| EP | 3446755 | | 2/2019 | |
| EP | 3446756 | | 2/2019 | |
| GB | 1155046 | | 6/1969 | |
| JP | H05137808 | | 6/1993 | |
| JP | 3039303 | | 7/1997 | |
| JP | H09225012 | | 9/1997 | |
| JP | 10066817 | | 3/1998 | |
| JP | H10165527 | | 6/1998 | |
| JP | 3077655 | | 5/2001 | |
| JP | 2003322712 | | 11/2003 | |
| JP | 2004364177 | | 12/2004 | |
| JP | 3117209 | U | 1/2006 | |
| JP | 2007236600 | | 9/2007 | |
| JP | 2011078604 | | 4/2011 | |
| JP | 2011078678 | | 4/2011 | |
| JP | 2011115449 | | 6/2011 | |
| JP | 2012-075793 | | 4/2012 | |
| JP | 2013127129 | | 6/2013 | |
| JP | 3196218 | | 2/2015 | |
| JP | 2015093036 | | 5/2015 | |
| JP | 2015-524337 | | 8/2015 | |
| JP | 2015527130 | | 9/2015 | |
| JP | 2016087376 | | 5/2016 | |
| JP | 2018000982 | | 1/2018 | |
| JP | 2018033905 | | 3/2018 | |
| JP | 2018089158 | | 6/2018 | |
| JP | 2018-146805 | | 9/2018 | |
| JP | 2019501721 | | 1/2019 | |
| KR | 10-1989-0000137 | | 3/1989 | |
| KR | 10-1995-0008732 | | 8/1995 | |
| KR | 20050061384 | | 6/2005 | |
| KR | 20100081991 | | 7/2010 | |
| KR | 20-2010-0009804 | | 10/2010 | |
| KR | 1020110067854 | | 6/2011 | |
| KR | 20120051735 | | 5/2012 | |
| KR | 200461294 | | 7/2012 | |
| KR | 101228403 | | 1/2013 | |
| KR | 101536265 | | 7/2015 | |
| KR | 101554664 | | 9/2015 | |
| KR | 101619487 | | 5/2016 | |
| KR | 20160062808 | | 6/2016 | |

(56) References Cited

FOREIGN PATENT DOCUMENTS

| | | | |
|---|---|---|---|
| KR | 20160129562 | 11/2016 | |
| KR | 20160132159 | 11/2016 | |
| KR | 101733470 | 4/2017 | |
| KR | 20170111132 | 10/2017 | |
| KR | 20170126163 | 11/2017 | |
| KR | 20180009326 | 1/2018 | |
| KR | 10-2018-0012496 | 2/2018 | |
| KR | 101827016 | 2/2018 | |
| KR | 1020180027561 | 3/2018 | |
| KR | 101849610 | 4/2018 | |
| KR | 20180043234 | 4/2018 | |
| KR | 20180045934 | 5/2018 | |
| KR | 20180064284 | 6/2018 | |
| KR | 20180091698 | 8/2018 | |
| KR | 20180128040 | 11/2018 | |
| KR | 10-2018-0130658 | 12/2018 | |
| KR | 101925388 | 12/2018 | |
| KR | 1020180135840 | 12/2018 | |
| KR | 10-1942785 | 1/2019 | |
| KR | 20190033299 | 3/2019 | |
| KR | 1020190033299 | 3/2019 | |
| KR | 10-2019-0053757 | 5/2019 | |
| KR | 10-2019-0022668 | 6/2019 | |
| KR | 102002878 | 7/2019 | |
| KR | 1020190089188 | 7/2019 | |
| KR | 20190095139 | 8/2019 | |
| KR | 20190100605 | 8/2019 | |
| KR | 1020190096496 | 8/2019 | |
| KR | 102023974 | 9/2019 | |
| KR | 10-2019-0119804 | 10/2019 | |
| KR | 101997813 | 10/2019 | |
| KR | 102065360 | 2/2020 | |
| KR | 1020200033495 | 3/2020 | |
| KR | 102110687 | 5/2020 | |
| KR | 20200048502 | 5/2020 | |
| KR | 1020200048502 | 5/2020 | |
| KR | 1020200049490 | 5/2020 | |
| KR | 1020200079925 | 7/2020 | |
| TW | 201201879 | 1/2012 | |
| TW | M555232 | 2/2018 | |
| TW | 201904614 | 2/2019 | |
| WO | WO 1996/22124 | 7/1996 | |
| WO | WO2009067583 | 5/2009 | |
| WO | WO2010070495 | 6/2010 | |
| WO | WO2014020469 | 2/2014 | |
| WO | WO 2016/072868 | 5/2016 | |
| WO | WO2016157159 | 10/2016 | |
| WO | WO2017004313 | 1/2017 | |
| WO | WO2017116174 | 7/2017 | |
| WO | WO2018036902 | 3/2018 | |
| WO | WO2018147941 | 8/2018 | |
| WO | WO-2019059699 A1 * | 3/2019 | ............. A41D 13/11 |
| WO | WO2020055106 | 3/2020 | |
| WO | WO2020094850 | 5/2020 | |

OTHER PUBLICATIONS

Machine translation of WO-2019059699-A1.*
Extended European Search Report in European Appln. No. 20217533.7, dated Jun. 8, 2021, 5 pages.
Korean Office Action in Korean Appln. No. 2020-0068404, dated Apr. 5, 2021, 11 pages (with English translation).
Korean Office Action in Korean Appln. No. 2020-0068407, dated Apr. 5, 2021, 11 pages (with English translation).
Korean Office Action in Korean Appln. No. 2020-0068611, dated Apr. 5, 2021, 11 pages (with English translation).
Korean Office Action in Korean Appln. No. 2020-0109160, dated Feb. 11, 2021, 21 pages (with English translation).
Office Action in U.S. Appl. No. 17/178,103, mailed on Jun. 30, 2023, 30 pages.
Office Action in Taiwanese Appln. No. 11120021940, dated Dec. 20, 2020, 11 pages (with English translation).
Notice of Allowance in Korean Appln. No. 10-2020-0068407, dated Nov. 29, 2021, 4 pages (with English translation).
Office Action in Korean Appln. No. 10-2020-0068400, dated Dec. 27, 2021, 13 pages (with English translation).
Office Action in Korean Appln. No. 10-2020-0068412, dated Dec. 27, 2021, 15 pages (with English translation).
Office Action in Korean Appln. No. 10-2020-0080417, dated Dec. 28, 2021, 13 pages (with English translation).
Office Action in Korean Appln. No. 10-2020-0089132, dated Dec. 28, 2021, 13 pages (with English translation).
Office Action in Korean Appln. No. 10-2020-0068413, dated Nov. 17, 2021, 13 pages (with English translation).
Office Action in Korean Appln. No. 10-2020-0080087, dated Nov. 30, 2021, 15 pages (with English translation).
Office Action in Indian Appln. No. 202114007027, dated Jan. 5, 2022, 6 pages.
Office Action in Indian Appln. No. 202114003123, dated Jan. 6, 2022, 5 pages.
Office Action in Indian Appln. No. 202114008985, dated Jan. 12, 2022, 5 pages.
Office Action in Indian Appln. No. 202114003125, dated Jan. 13, 2022, 5 pages.
Office Action in Indian Appln. No. 202114007372, dated Jan. 24, 2022, 6 pages.
Extended European Search Report in European Appln. No. 21169773.5, dated Sep. 24, 2021, 4 pages.
Extended European Search Report in European Appln. No. 21169777.6, dated Sep. 24, 2021, 5 pages.
Notice of Allowance in Korean Appln. No. 10-2020-0068413, dated May 31, 2022, 4 pages (with English translation).
Notice of Allowance in Korean Appln. No. 10-2020-0080087, dated Jun. 30, 2022, 5 pages (with English translation).
Office Action in Chinese Appln. No. 202011328161.5, dated Apr. 2, 2022, 15 pages (with English translation).
Office Action in Chinese Appln. No. 202110046911.8, dated Apr. 15, 2022, 12 pages (with English translation).
Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japanese Appln. No. 2021-043251, dated May 10, 2022, 6 pages (with English translation).
Office Action in Japanese Appln. No. 2021-073811, dated May 10, 2022, 6 pages (with English translation).
Office Action in Japanese Appln. No. 2021-074825, dated Apr. 19, 2022, 6 pages (with English translation).
Office Action in Japanese Appln. No. 2021-090930, dated Jun. 14, 2022, 10 pages (with English translation).
Korean Office Action in Korean Appln. No. 2020-070885882, dated Dec. 15, 2020, 19 pages (with English translation).
Notice of Allowance in Japanese Appln. No. 2020-204668, dated Aug. 16, 2022, 5 pages (with English translation).
Office Action in Chinese Appln. No. 202110552518.6, dated Jul. 4, 2022, 18 pages (with English translation).
Office Action in Chinese Appln. No. 202011089763, mailed on Feb. 11, 2023, 18 pages (with English translation).
Office Action in Chinese Appln. No. 202011328031, mailed on Feb. 15, 2023, 18 pages (with English translation).
Office Action in Chinese Appln. No. 202110184702, mailed on Mar. 18, 2023, 23 pages (with English translation).
Office Action in Korean Appln. No. 20210129533, mailed on Mar. 28, 2023, 18 pages (with English translation).
Office Action in Korean Appln. No. 20220126062, mailed on Mar. 23, 2023, 23 pages (with English translation).
Office Action in U.S. Appl. No. 17/170,035, mailed on Feb. 8, 2023, 8 pages.
Office Action in Japanese Appln. No. 2020-204668, dated Feb. 7, 2022, 12 pages (with English translation).
Office Action in Korean Appln. No. 10-2020-0080437, dated Feb. 21, 2022, 13 pages (with English translation).

(56) References Cited

OTHER PUBLICATIONS

Office Action in Korean Appln. No. 10-2020-0068421, dated Jan. 23, 2022, 12 pages (with English translation).
Office Action in Chinese Appln. No. 202011403700.7, dated May 4, 2023, 18 pages (with English translation).
Office Action in Chinese Appln. No. 202110096186.5, mailed on Jun. 3, 2023, 16 pages (with English translation).
Office Action in U.S. Appl. No. 17/230,206, dated Jun. 22, 2023, 18 pages.
Office Action in U.S. Appl. No. 17/231,472, dated Jun. 23, 2023, 23 pages.
Extended European Search Report in European Appln. No. 21169778.4, dated Oct. 15, 2021, 5 pages.
Extended European Search Report in European Appln. No. 21169793.3, dated Oct. 15, 2021, 4 pages.
Extended European Search Report in European Appln. No. 21169796.6, dated Oct. 18, 2021, 4 pages.
Extended European Search Report in European Appln. No. 21169813.9, dated Oct. 20, 2021, 4 pages.
Extended European Search Report in European Appln. No. 21169817.0, dated Oct. 14, 2021, 4 pages.
Extended European Search Report in European Appln. No. 21170476.2, dated Oct. 13, 2021, 4 pages.
Extended European Search Report in European Appln. No. 21170861.5, dated Oct. 25, 2021, 4 pages.
Decision to Grant a Patent in Japanese Appln. No. 2021-043251, dated Oct. 25, 2022, 5 pages (with English translation).
Office Action in European Appln. No. 20217533.7, dated Nov. 23, 2022, 5 pages.
Office Action in European Appln. No. 21182279.6, dated Oct. 17, 2022, 2 pages.
Office Action in Taiwanese Appln. No. 110117972, dated Oct. 7, 2022, 14 pages (with English translation).
Office Action in U.S. Appl. No. 17/170,035, dated Sep. 29, 2022, 19 pages.
Written Decision on Registration in Korean Appln. No. 10-2020-0080437, dated Oct. 22, 2022, 11 pages (with English translation).
Extended European Search Report in European Appln. No. 20217535.2, dated Jun. 22, 2021, 4 pages.
Extended European Search Report in European Appln. No. 20217537.8, dated Jun. 22, 2021, 4 pages.
Office Action in Korean Appln. No. 10-2020-0068404, dated Jun. 30, 2021, 12 pages (with English translation).
Office Action in Korean Appln. No. 10-2020-0068611, dated Jun. 30, 2021, 12 pages (with English translation).
Office Action in Taiwanese Appln. No. 109146705, dated Jul. 7, 2021, 19 pages (with English translation).
Office Action in Taiwanese Appln. No. 110102539, dated Jul. 12, 2021, 10 pages (with English translation).
Office Action in Taiwanese Appln. No. 110102540, dated Jul. 12, 2021, 19 pages (with English translation).
Office Action in Taiwanese Appln. No. 110105039, dated Jul. 12, 2021, 15 pages (with English translation).
Notice of Allowance in U.S. Appl. No. 17/178,103, mailed on Nov. 3, 2023, 12 pages.
Office Action in Korean Appln. No. 10-2022-0126062, mailed on Sep. 26, 2023, 8 pages (with English translation).
Office Action in U.S. Appl. No. 17/230,206, mailed on Oct. 12, 2023, 19 pages.
Office Action in U.S. Appl. No. 17/231,472, mailed on Oct. 23, 2023, 19 pages.
Office Action in U.S. Appl. No. 17/244,683, mailed on Oct. 13, 2023, 21 pages.
Notice of Allowance in U.S. Appl. No. 17/174,766, mailed on Dec. 5, 2023, 12 pages.
Notice of Allowance in U.S. Appl. No. 17/244,683, mailed on Feb. 8, 2024, 14 pages.
Office Action in Chinese Appln. No. 202110096186.5, mailed on Feb. 9, 2024, 7 pages (with English translation).
Office Action in U.S. Appl. No. 17/121,056, mailed on Dec. 21, 2023, 10 pages.
Office Action in U.S. Appl. No. 17/121,115, mailed on Dec. 20, 2023, 11 pages.
Office Action in U.S. Appl. No. 17/231,462, mailed on Dec. 28, 2023, 17 pages.
Office Action in U.S. Appl. No. 17/231,472, mailed on Feb. 27, 2024, 20 pages.

* cited by examiner

MASK APPARATUS AND METHOD FOR CONTROLLING THE SAME

CROSS-REFERENCE TO RELATED APPLICATIONS

The present application claims the benefits of priority to Korean Patent Application No. 10-2020-0068402, filed on Jun. 5, 2020, the disclosure of which is incorporated herein by reference in its entirety.

TECHNICAL FIELD

The present disclosure relates to a mask apparatus and a method for controlling the same.

BACKGROUND

A mask is a device that can cover a user's nose and mouth to avoid inhalation of germs and dust or droplet transmission by viruses or bacteria. The mask can be in close contact with the user's face to cover the user's nose and mouth. The mask can filter germs, dust, and the like, which may be contained in the air, provide filtered air to the user. Air containing germs and dust can pass through a body of the mask including a filter configured to block the germs and the dust.

In some cases, the mask can cause uncomfortable breathing since air is introduced into the user's nose and mouth and discharged to the outside through the body of the mask. In some cases, a mask can include a motor, a fan, and a filter to help breathing with the mask.

In some examples, an electronic mask may include a mask portion surrounding a user's face, a wear sensing portion provided on an inner edge of the mask portion to sense whether the mask portion is worn, a breathing pattern sensing portion provided inside the mask portion to sense user's breathing pattern, and an air purification portion purifying external air to transfer the purified air to the inside of the mask part.

The electronic mask can control the breathing pattern sensing portion according to sensing information of the wear sensing portion and control the air purifying portion according to a difference between the breathing pattern sensed through the breathing pattern sensing portion and a preset normal breathing pattern.

In some examples, the electronic mask can include a pressure sensor provided inside the mask portion to sense a pressure between a user's front face and the mask part. Accordingly, the control portion of the electronic mask can determine a breathing state of the user by comparing a change in pressure between the user's front face and the mask portion with the preset normal pressure.

In some cases, where the pressure sensor is disposed inside the mask portion so as to be exposed, fogging can occur due to breathing and snorting from the user's mouth or nose. That is, the water vapor contained in the breathing or snorting can come into direct contact with the pressure sensor, and as a result, moisture may be permeated into the pressure sensor, thereby deteriorating reliability of the sensor.

In some cases, an error in pressure value sensed by the pressure sensor can occur due to a flow amount and flow speed of air from the user's mouth or nose. For example, when the air discharged from the mouth or nose is directly directed to the pressure sensor, a sensing error can occur due to a large change in pressure around the pressure sensor.

In addition, when talking or coughing while wearing the electronic mask, there is a limitation that the pressure sensor is contaminated or wetted by saliva discharged from the nose or mouth.

In some cases, a dust mask may include a mask body, a filter formed on the mask body, a motor controlling a flow rate of air introduced through the filter, and a differential sensor measuring a pressure change inside the mask body.

The dust mask can set an operation mode based on a difference in pressure measured from the differential sensor and vary a maximum output or minimum output of the motor according to the set operation mode. Thus, the operation mode can be determined in real time according to a user's breathing state, and the output of the motor can be appropriately controlled according to the determined operation mode to improve wearing environments of the mask.

In some cases, the dust mask can determine whether the user breathes or talks using the pressure difference in the inner space of the mask, and constantly control an output of the motor. The dust mask does not specifically consider the user's breathing state.

For example, the dust mask can keep the same rotation speed of a fan at the beginning of user's inhalation and the beginning of user's exhalation. In this case, the breathing may be uncomfortable when the user inhales or exhales. For instance, when the rotation speed of the fan is high, the inhalation is easier, but the exhalation is difficult. When the rotation speed of the fan is slow, the exhalation is easier, but the inhalation is difficult.

The rotation speed of the fan be controlled to provide an air volume according to the breathing state.

SUMMARY

The present application describes a mask apparatus capable of accurately sensing a pressure inside a mask through a sensor provided in the mask and a method for controlling the same.

The present application also describes a mask apparatus that can help to prevent a sensor from being covered by steam generated by snorting or breathing of a user who wears a mask, and a method for controlling the same.

The present application also describes a mask apparatus capable of appropriately controlling an inhalation flow rate (external air) according to a user's breathing state, and a method for controlling the same.

The present application further describes a mask apparatus capable of varying a rotation speed of a fan based on a pressure state inside the mask, and a method for controlling the same.

The present application further describes a mask apparatus capable of accurately sensing a pressure (e.g., air pressure) inside a mask by a simple structure, and a method for controlling the same.

The present application further describes a mask apparatus capable of analyzing a user's breathing pattern (such as inhalation or exhalation) and assisting user's breathing according to the analyzed result, and a method for controlling the same.

According to one aspect of the subject matter described in this application, a mask apparatus includes a mask body including a body front surface and a body rear surface configured to cover at least a portion of a user's face, a fan module disposed at the body front surface, a mask body cover that is coupled to the mask body and defines an inner space accommodating the fan module, a seal coupled to the body rear surface and configured to define a breathing space between the mask body and the user's face. The mask body defines an opening that passes through the mask body and that connects the inner space of the mask body cover to the breathing space. A pressure sensor is disposed in the opening and configured to sense air pressure in the breathing space.

Implementations according to this aspect may include one or more of the following features. For example, the mask apparatus can include a substrate that is disposed at the body front surface and supports the pressure sensor. In some examples, the substrate covers a front side of the opening. In some implementations, the mask apparatus can include a sensor mounting portion that protrudes from the body front surface and defines a periphery of the opening, where a front end of the sensor mounting portion is in contact with and supports a rear surface of the substrate.

In some examples, the substrate and the sensor mounting portion are in contact with each other to thereby define a space accommodating the pressure sensor. In some examples, the opening includes a first space that accommodates the pressure sensor, and a second space that connects the first space to the breathing space. A portion of the sensor mounting portion can protrude from the body front surface in an inclined direction to thereby define the second space at a position below or above the first space. In some examples, a cross-sectional area of the second space decreases along a direction toward the first space.

In some examples, a portion of the sensor mounting portion can protrude from the body front surface in an inclined direction, and be configured to convert a flow direction of air introduced into the second space and to guide the air to the first space.

In some implementations, the fan module can include a first fan module disposed at a first side with respect to a center of the mask body, and a second fan module disposed at a second side with respect to the center of the mask body. The opening can be defined at a position in the mask body between the first fan module and the second fan module.

In some implementations, the mask apparatus can include a pair of air ducts disposed at the body front surface and configured to guide external air to the breathing space based on operation of the first fan module and the second fan module. In some examples, the body rear surface can define a pair of air outlets configured to discharge air received through the pair of air ducts to the breathing space, and the opening can be defined at a position in the mask body between the pair of air outlets.

In some implementations, the sensor mounting portion can include a first portion that defines an upper edge of the opening, a pair of second portions that respectively extend downward from side ends of the first portion and define side edges of the opening, and a third portion that connects the pair of second portions to each other. The third portion can be inclined toward the first portion and configured to convert a flow direction of air from the breathing space toward the pressure sensor.

According to another aspect, a method for controlling a mask apparatus includes sensing, by a pressure sensor, air pressure of a breathing space of the mask apparatus, the breathing space being configured to face a respiratory organ of a user, determining a breathing pattern of the user based on the air pressure, determining expected time points of inhalation and expected time points of exhalation based on the breathing pattern of the user, and varying a rotation speed of a fan module of the mask apparatus based on the expected time points of the inhalation and the expected time points of exhalation.

Implementations according to this aspect may include one or more of the following features. For examples, the expected time points of inhalation and the expected time points of exhalation can be determined based on a breathing cycle that is determined based on maximum values of the air pressure and minimum values of the air pressure. In some examples, the expected time points of inhalation and the expected time points of exhalation can be determined by (i) determining each of the expected time points of inhalation based on a time point corresponding to one of the maximum values within the breathing cycle, where each of the expected time points of inhalation represents a start point of inhalation, and (ii) determining each of the expected time points of exhalation based on a time point corresponding to one of the minimum values within the breathing cycle, where each of the expected time points of exhalation representing a start point of exhalation.

In some implementations, varying the rotation speed of the fan module includes increasing the rotation speed of the fan module based on a current time corresponding to one of the expected time points of inhalation. In some implementations, varying the rotation speed of the fan module includes starting operation of the fan module based on a current time corresponding to one of the expected time points of inhalation.

In some implementations, varying the rotation speed of the fan module includes decreasing the rotation speed of the fan module based on a current time corresponding to one of the expected time points of exhalation. In some implementations, varying the rotation speed of the fan module includes stopping operation of the fan module based on a current time corresponding to one of the expected time points of exhalation.

In some implementations, varying the rotation speed of the fan module includes, based on a current time corresponding to one the expected time points of exhalation, increasing or decreasing the rotation speed of the fan module in proportion to a change of the air pressure sensed by the pressure sensor.

In some implementations, where the pressure sensor is provided in the opening passing through the mask body, the pressure sensor can be disposed adjacent to the user's nose or mouth. Therefore, there can be the advantage that the pressure of the breathing space is accurately measured.

In some implementations, where the air discharged from the nose or mouth is not directly introduced into the pressure sensor, there can be the advantage in that the pressure sensor is prevented from being steamed by the snorting or breathing discharged during the breathing process.

In some implementations, where the sensor mounting portion is disposed along the periphery of the opening, and the substrate to which the pressure sensor is fixed is supported by being in contact with the sensor mounting portion, there can be the advantage that the pressure sensor is stably fixed.

In some implementations, the opening can include the first space, in which the pressure sensor is disposed, and the second space that connects the first space to the breathing space and is defined below the first space.

In some implementations, the cross-sectional area of the passage of the second space can be defined to be less than that of the passage of the first space, and the flow direction of the air introduced from the breathing space to the second space can be changed in the process of moving to the first space. Therefore, there can be the advantage that the breathing and the snorting discharged from the user's mouth or nose are not directed directly to the pressure sensor.

In some implementations, since the user's breathing state (the inhalation and exhalation) is determined according to the pressure inside the mask, and the rotation speed of the fan module is varied based on the determined information, the flow rate of the inhalation (external air) can be appropriately provided during the breathing. Therefore, there can be the advantage that the breathing is easier while wearing the mask apparatus.

In some implementations, since the pressure inside the mask is determined by the simple structure, the manufacturing process can be simplified, and the price can be inexpensive.

In some implementations, there can be the advantage in that the sensing function is improved by installing the pressure sensor at the position adjacent to the nose while minimizing the influence on the air discharged from the fan module.

DETAILED DESCRIPTION

Figure 1:
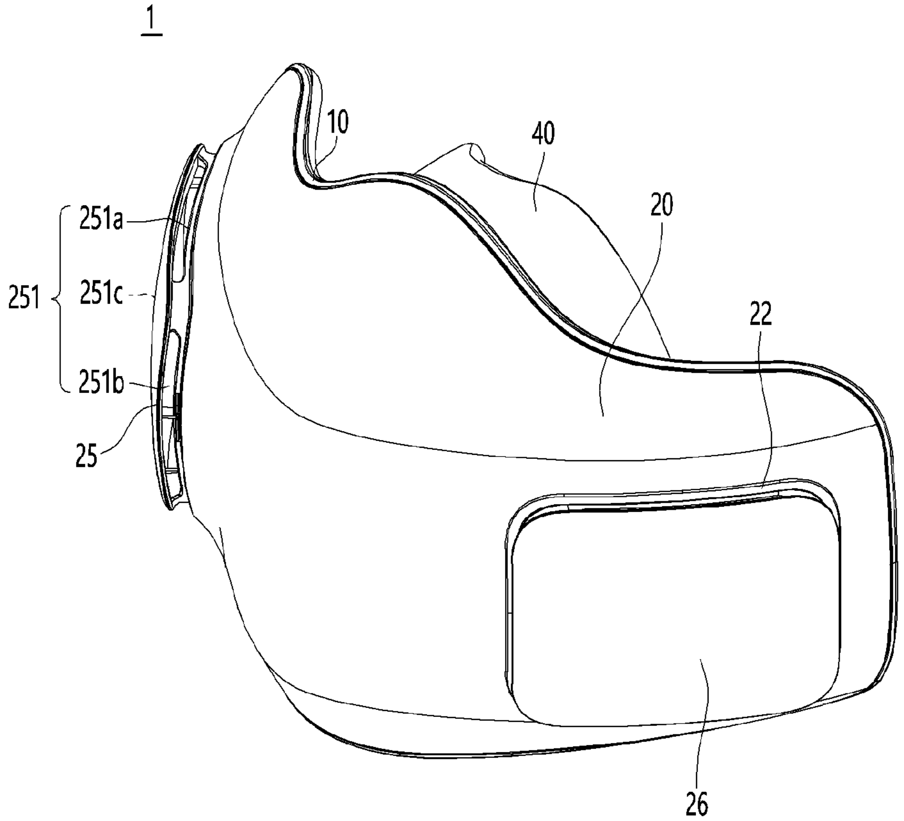
FIG. 1 is a left perspective view showing an example of a mask apparatus.
Figure 2:
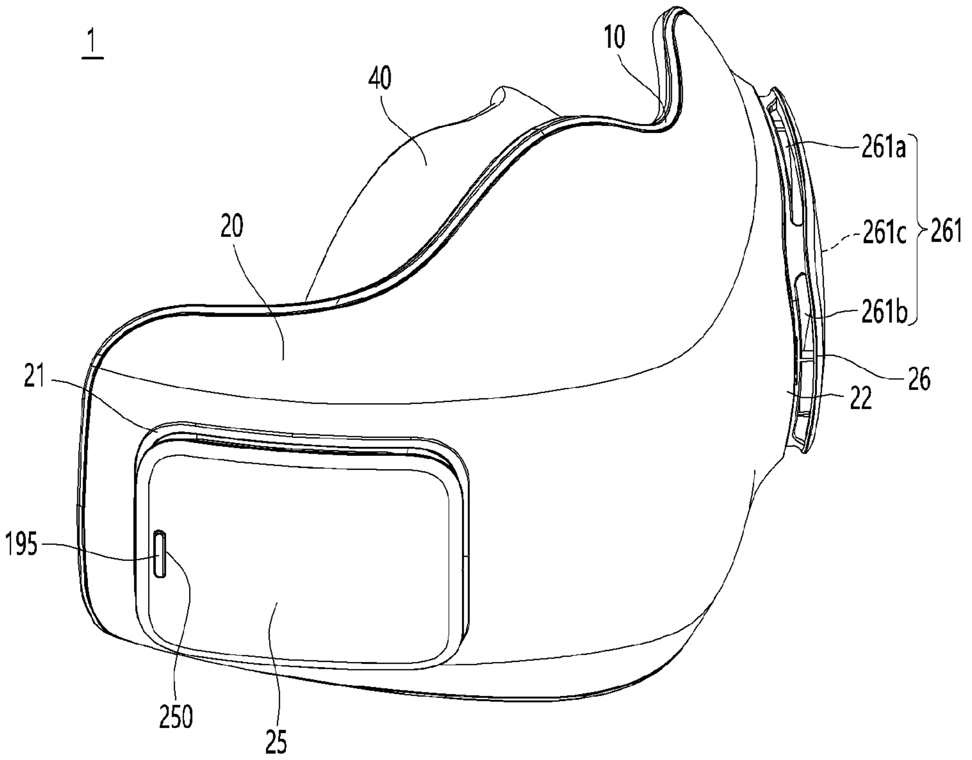
FIG. 2 is a right perspective view showing the mask apparatus.
Figure 3:
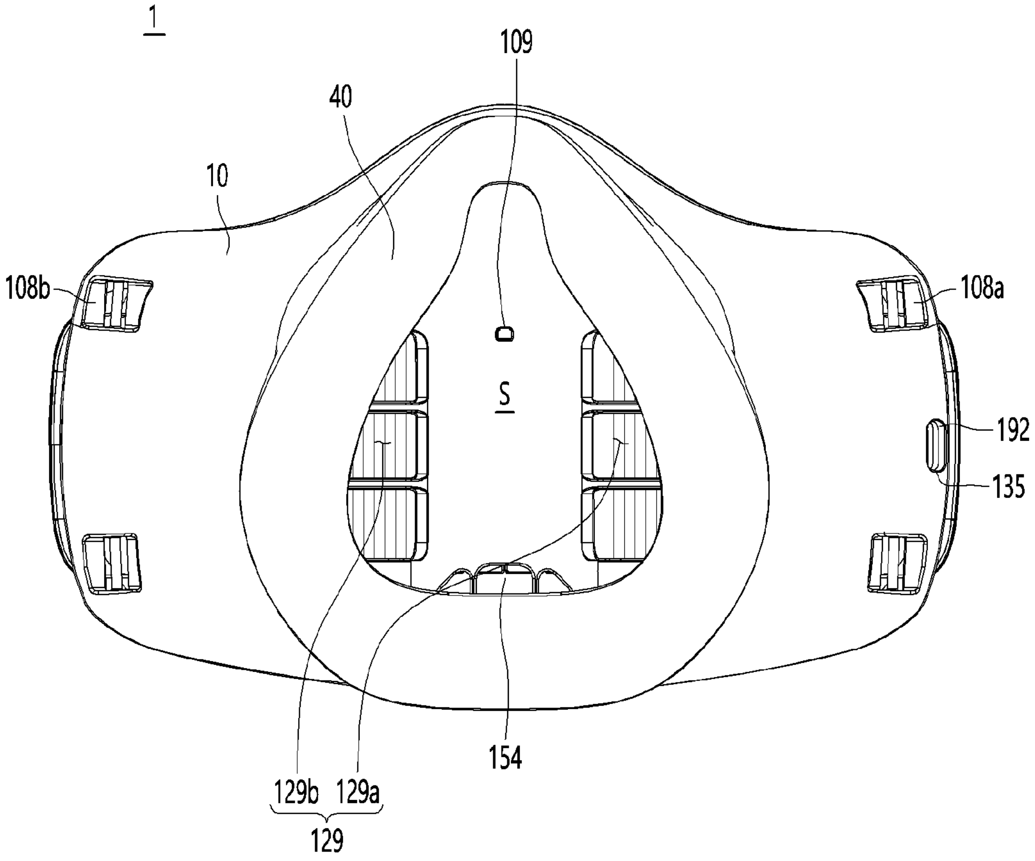
FIG. 3 is a rear view showing the mask apparatus.
Figure 4:
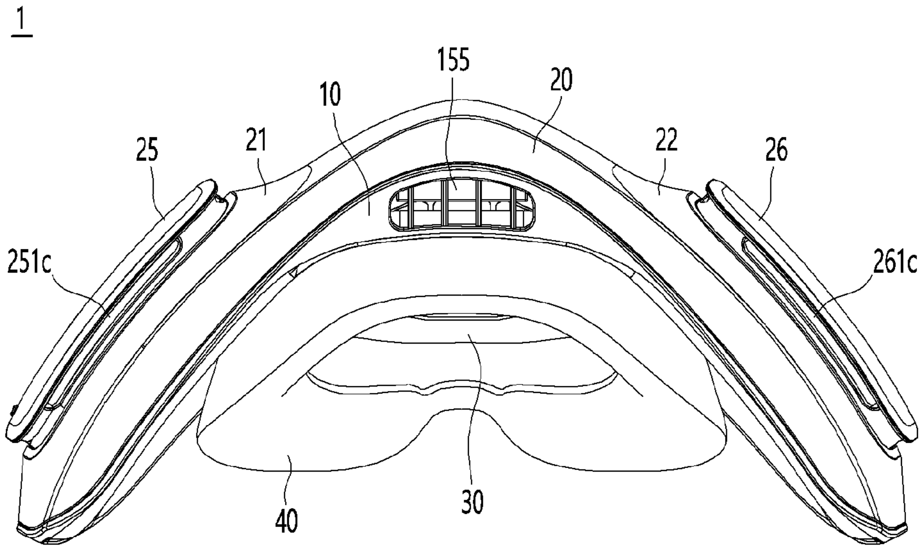
FIG. 4 is a bottom view showing the mask apparatus.

FIG. 1 is a left perspective view showing an example of a mask apparatus, FIG. 2 is a right perspective view showing the mask apparatus, FIG. 3 is a rear view showing the mask apparatus, and FIG. 4 is a bottom view showing the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus 1, which is exposed to the outside, is disposed.

The mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. In some examples, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the breathing space S.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

In some examples, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and 24 (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22, respectively. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. In some implementations, each of the first and second air inlets 251 and 261 can be respectively defined in the front surface portions of the first and second filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air suction hole 251*a* defined in the right side surface, a second air suction hole 251*b* defined in the left side surface, and a third air suction hole 251*c* defined in the upper side surface.

Similarly, when a plurality of the second air inlets 261 are provided in the side surface portions of the second filter cover 26, the second air inlets 261 can include a first air suction hole 261*a* defined in the left side surface, a second air suction hole 261*b* defined in the right side surface, and a third air suction hole 261*c* defined in the upper side surface.

An opening 250 can be defined in one of the first filter cover 25 and the second filter cover 26, and the opening 250 can be defined in an edge of one of the first filter cover 25 and the second filter cover 26. In some examples, a manipulation portion 195 for controlling an operation of the mask apparatus 1 can be mounted in the opening 250. In some examples, the manipulation portion 195 is mounted on the first filter cover 25 as an example.

The manipulation portion 195 can serve as a manipulation switch that turns on/off power of the mask apparatus 1. The manipulation portion 195 can be exposed to the front side of the mask apparatus 1 while being mounted in the opening 250.

That is, the hook mounting portion 108 can include a first hook mounting portion 108*a* provided at a right side of the mask body 10, and a second hook mounting portion 108*b* provided at a left side of the mask body 10.

Each of the first hook mounting portion 108*a* and the second hook mounting portion 108*b* can be provided in plurality to be spaced apart from each other in a vertical direction of the mask body 10. In detail, the first hook mounting portion 108*a* can be provided at each of the upper right and lower right sides of the mask body 10, and the second hook mounting portion 108*b* can be provided at each of the upper left and lower left sides of the mask body 10.

A band for maintaining the mask apparatus 1 in close contact with the user's face can be mounted on the hook mounting portion 108.

For example, both ends of the band can connect the first hook mounting portion 108*a* to the second hook mounting portion 108*b*. In some examples, both ends of the band can connect can connect each of two first hook mounting portions 108*a*, which are spaced apart from each other in the vertical direction, to each of two second hook mounting portions 108*b*, which are spaced apart from each other, in the vertical direction to each other.

In some examples, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. In some examples, the air of which a temperature increases while cooling the electronic components can be discharged again to the outside of the mask body 10 through the hook mounting portion 108. In some examples, to restrict a flow of the air introduced into the inner space through the hook mounting portion 108 into the breathing space, the inside of the mask apparatus 1 can have a sealing structure.

The mask body 10 can include an air outlet 129 for supplying the filtered air to the breathing space. The user can breathe while breathing the filtered air supplied through the air outlet 129 to the breathing space.

The air outlet 129 can include a first air outlet 129*a* through which the filtered air introduced into the first air inlet 251 is discharged to the breathing space S and a second air outlet 129*b* through which the filtered air introduced into the second air inlet 261 is discharged to the breathing space S.

The first air outlet 129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129*a*. The air introduced through the second air inlet 261 can pass through the second filter 24 and then flow to the second air inlet 261.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

A check valve can be provided in one or more of the first air exhaust hole 154 and the second air exhaust hole 155. The external air can be introduced into the breathing space, or the air discharged through the second air exhaust hole 155 can be prevented from flow backward by the check valve. The check valve can be disposed in the flow space between the first air exhaust hole 154 to the second air exhaust hole 155.

For example, the check valve having the form of a flat flap with a size and shape corresponding to the size and shape of the first air exhaust hole 154 can be provided.

In detail, an upper end of the flap can be connected to an upper edge of the first air exhaust hole 154, and when the user exhales, the flap can be bent or rotates to open the first air exhaust hole 154, and when the user inhales, the flap can be in close contact with the first air exhaust hole 154 to prevent the external air or the discharged air from being introduced again into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector for supplying power to the mask apparatus 1 is installed. The connector hole 135 can be defined at either a left edge or a right edge of the mask body 10.

In some examples, since the manipulation portion 195 and the connector are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
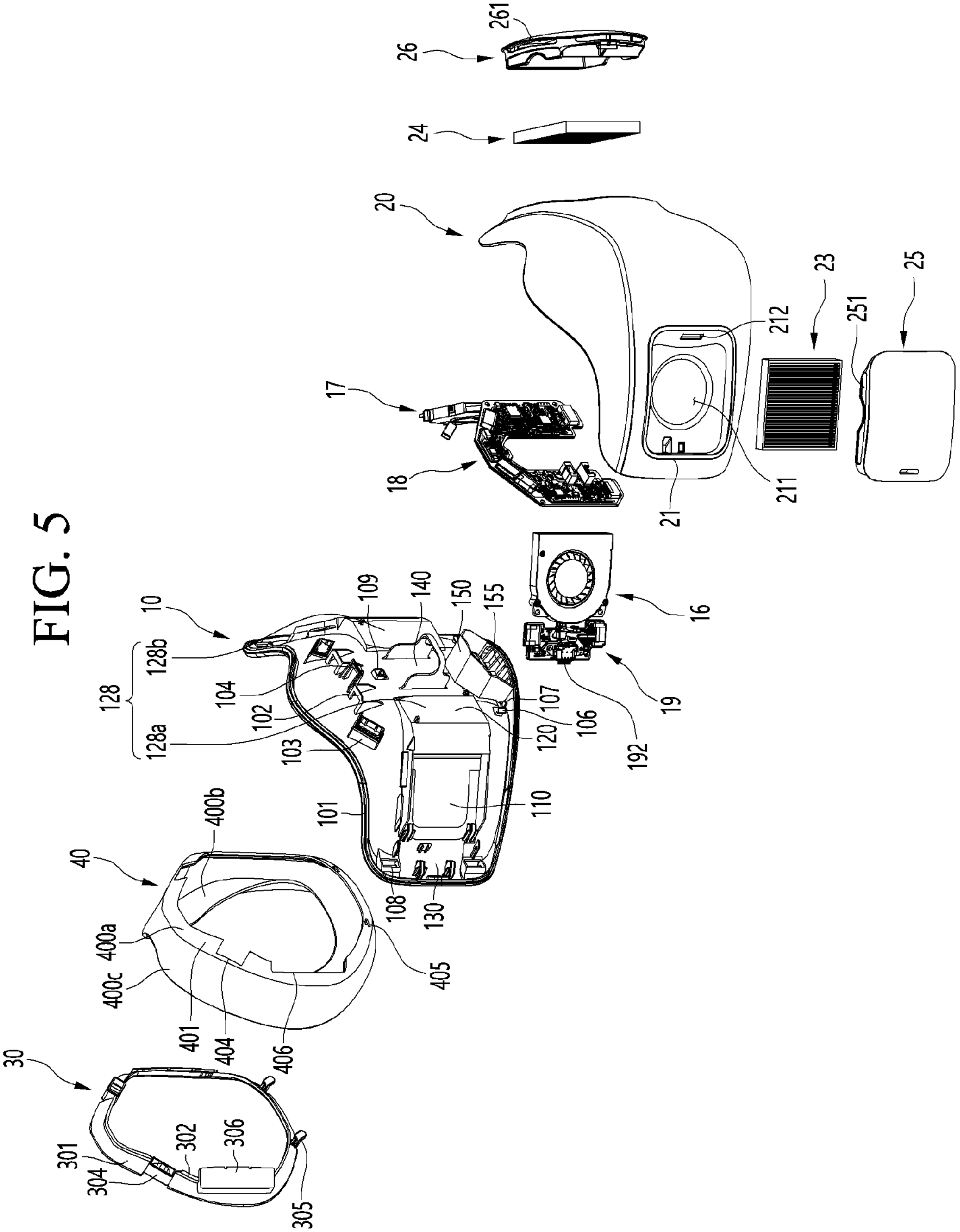
FIG. 5 is an exploded perspective view showing the mask apparatus.

FIG. 5 is an exploded perspective view showing the mask apparatus.

Referring to FIG. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating components for the operation of the mask apparatus 1 can be defined between the mask body 10 and the mask body cover 20. The sealing bracket 30 and the seal 40 are coupled to the rear surface of the mask body 10 to define the breathing space between the user's face and the mask body 10 and prevent the external air from being introduced into the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some examples, the first cover coupling portion 102 can be provided at the left and right sides of the mask body 10 based on the center of the mask body 10, respectively. The first cover coupling portion 102 can be referred to as an upper cover coupling portion.

The mask body 10 can include a first bracket coupling portion 103. The first bracket coupling portion 103 can be disposed above the mask body 10. The first bracket coupling portion 103 can support an upper portion of the sealing bracket 30.

The first bracket coupling portion 103 can be disposed above a rear surface of the mask body 10.

For example, the first bracket coupling portion 103 can be provided by allowing a portion constituting the mask body 10 to protruding forward from the rear surface of the mask body 10. Thus, the first bracket coupling portion 103 can be understood as a recess when viewed from a rear side of the mask body 10 and a protrusion when viewed from a front side of the mask body 10.

The sealing bracket 30 can include a first body coupling portion 304 that has the same shape as the recessed shape of the first bracket coupling portion 103 and is seated on the first bracket coupling portion 103.

The first bracket coupling portion 103 can be provided at each of the left and right sides of the mask body 10. The first bracket coupling portion 103 can be defined as an upper bracket coupling portion.

The mask body 10 can include a support rib 104.

The support rib 104 can be provided to protrude forward from the front surface of the mask body 10. The support rib 104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in a plurality on the front surface of the mask body 10.

The support rib 104 can perform a function of fixing a portion of the control module 18 mounted on the mask body 10. For this, the support rib 104 can include a hook shape. In other words, a hook protrusion can protrude from an end of the support rib 104 to fix the end of the control module 18.

The mask body 10 can include a second cover coupling portion 106.

A lower portion of the mask body cover 20 can be supported on the second cover coupling portion 106. The second cover coupling portion 106 can protrude in a hook shape from a front lower end of the mask body 10. The first cover coupling portion 102 can be provided at each of the left and right sides of the mask body 10 based on the center of the mask body 10. The second cover coupling portion 106 can be defined as a lower cover coupling portion.

A hook hooking portion to which the second cover coupling portion 106 is coupled can be disposed on the mask body cover 20, and the hook hooking portion can be disposed at each of left and right sides of the mask body cover 20.

The mask body 10 can include the second bracket coupling portion 107. A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some examples, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10. A passage through which air passes can be provided in the air duct 120. The fan module mounting portion 110 can be disposed at a suction-side of the air duct 120. The suction-side of the air duct 120 can be defined as any location where the air duct 120 introduces air therein. For instance, the suction-side may be a lateral side, a top side, a bottom side, a front side, or a rear side, etc. of the air duct 120.

The air duct 120 can include a first air duct connected to the first fan module mounting portion and a second air duct connected to the second fan module mounting portion.

The first air duct and the second air duct can be disposed on an edge of the first fan module mounting portion and an edge of the second fan module mounting portion, which are adjacent to the center of the front surface of the mask body 10 so as to be disposed between the first fan module mounting portion and the second fan module mounting portion.

In some examples, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlets of the fan modules 16 and 17 to allow the external air to be introduced into the air duct 120. In addition, the other end of the air duct 120 communicates with the air outlet 129 so that the air introduced into the air duct 120 is discharged into the breathing space S.

A control module 18 can be mounted on the front surface of the air duct 120.

A control module mounting portion 128 for mounting the control module 18 can be disposed on the front surface of the air duct 120. A portion of the front surface of the air duct 120 can be provided as a flat portion on which the control module 18 is capable of being seated, and the flat portion can be defined as the control module mounting portion 128.

The control module mounting portion 128 can include a first control module mounting portion **128*a* provided in the first air duct and a second control module mounting portion 128*b* provided in the second air duct. One control module 18 can be fixed to the first control module mounting portion 128*a* and the second control module mounting portion 128*b*, or a plurality of control modules can be respectively fixed to the first and second control module mounting portions 128*a* and 128*b***.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. In some examples, a connector hole 135 can be defined in the side end of the mask body 10 provided with the power module mounting portion 130.

The mask body 10 can include a battery mounting portion 140 for mounting a battery.

The battery mounting portion 140 can be disposed on the front surface of the mask body 10. The battery mounting portion 140 can be provided to protrude forward from the front surface of the mask body 10 so as to surround the battery.

For example, the battery mounting portion 140 can include a pair of guide ribs protruding forward from the front surface of the mask body 10 and a connection rib connecting front ends of the pair of guide ribs to each other. In some examples, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 to be described later.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. In some examples, the air discharge portion 150 can extend to be rounded in an arch shape or can be bent several times to extend.

When the mask body cover 20 is coupled to the mask body 10, a front end of the air discharge portion 150 can be in contact with the rear surface of the mask body cover 20, and the inner space of the mask body 10 and the flow space can be distinguished from each other. The air discharge portion 150 can define a top surface and both side surfaces of the flow space, and a rear surface of the mask body cover 20 can define a front surface of the flow space. In some examples, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. It is connected to lower ends of both sides of the air discharge portion 150 having the arch shape or tunnel shape can be connected to the bottom surface of the mask body 10, and the bottom surface of the mask body 10 can be defined by the rib extending forward from the lower end of the front surface of the mask body 10. The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 to be recessed by a predetermined depth toward the rear surface of the mask body cover 20. Filters 23 and 24 are accommodated inside the filter mounting portions 21 and 22 provided by being recessed, and filter covers 25 and 26 can be mounted on edges of the filter mounting portions 21 and 22 in the state in which the filters 23 and 24 are accommodated.

Air suction ports 211 and 221 can be defined in the filter mounting portions 21 and 22. The air suction ports 211 and 221 can communicate with suction holes defined in the front surfaces of the fan modules 16 and 17, respectively. Each of edges of the air suction ports 211 and 221 can have an inclined surface that inclined in a direction in which a diameter gradually decreases from the front surface to the rear surface.

A filter cover mounting groove 212 for fixing each of the filter covers 25 and 26 can be defined in a side surface of each of the filter mounting portions 21 and 22. A coupling protrusion inserted into the filter cover mounting groove 212 and 222 can be disposed on each of the filter covers 25 and 26. FIG. 5 illustrates only the coupling protrusion 262 disposed on the left filter cover 26, but the same coupling protrusion is disposed on the right filter cover 25 as well.

A sealing material for sealing can be provided between the edges of the rear surfaces of the air suction ports 211 and 221 of the filter mounting portions 21 and 22 and the fan inlets of the fan modules 16 and 17. The sealing material can surround the air suction ports 211 and 221 and edges of the fan inlets of the fan modules 16 and 17 to prevent the external air from being introduced.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction port 211, and the air suction hole defined in the second filter mounting portion 22 can be defined as a second air suction port 221.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit component, and the power module 19 can be referred to as a second electronic circuit component.

The fan modules 16 and 17 can include a fan, a fan motor, and a fan housing accommodating the fan and the fan motor. The fan housing can include a suction hole through which the air is introduced into the fan, and a discharge hole through which the air forcedly flowing by the fan is discharged.

In some implementations, the fan can include a centrifugal fan that suctions air from the front side of the mask body cover 20 and discharges the air to the side of the mask body 10. In some examples, the fan can include the axial fan, the cross flow fan, or other types of fans.

The air introduced through the first air inlet 251 to pass through the first filter 23 is suctioned through the first air suction port 211. In some examples, the air introduced through the second air inlet 261 to pass through the second filter 24 is suctioned through the second air suction port 221.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to the control module mounting portion 128.

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 and the manipulation portion 195. Thus, the control module 18 can operate by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop. The seal 40 can be detachably coupled to the sealing bracket 30.

In some examples, the sealing bracket 30 is coupled to be detachable from the mask body 10 to separate the sealing bracket 30 from the mask body 10. With this structure, only the sealing bracket 30 is separated, or an assembly of the seal 40 and the sealing bracket 30 is separated from the mask body 10 to clean only sealing bracket 30 or clean both the sealing bracket 30 and the seal 40.

After the seal 40 is coupled to the sealing bracket 30, when the sealing bracket 30 is coupled to the mask body 10, the seal 40 is stably fixed to the mask body 10.

The sealing bracket 30 can include a sealing insertion portion 301 inserted into an inner edge of the seal 40.

Figure 13:
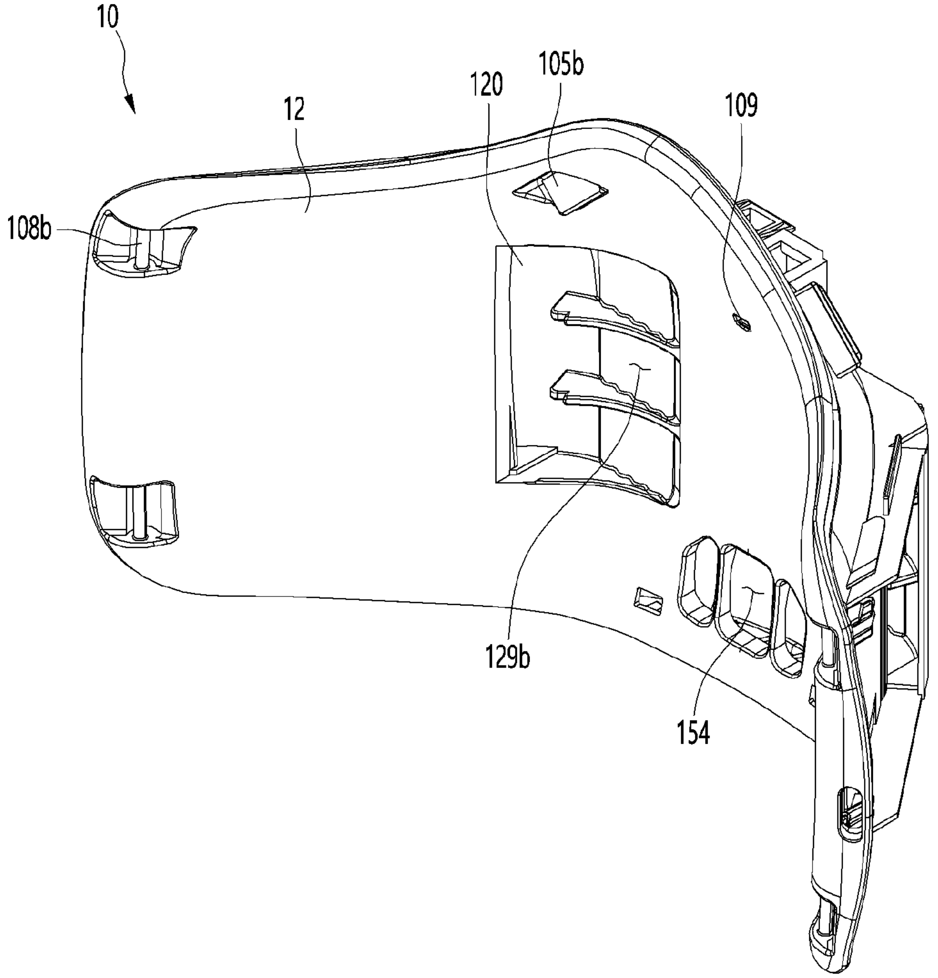
FIG. 13 is a rear perspective view showing the mask body.

The inner edge of the seal 40 can be provided in a shape of seal lips that is branched into two portions, and the sealing insertion portion 301 can be inserted into the seal lips (see FIG. 13).

The sealing insertion portion 301 can have a cross-sectional shape having a constant thickness or a cross-sectional shape of which a thickness decreases from an inner edge toward an outer edge. A body of the sealing bracket 30 can be provided by the sealing insertion portion 301 and a fixing guide 302 to be described later.

The sealing bracket 30 can include the fixing guide 302. The fixing guide 302 can be bent at an inner end of the sealing insertion portion 301. In some examples, when the sealing insertion portion 301 can be completely inserted into the seal lips of the seal 40, one of the two seal lips is in contact with the fixing guide 302. That is, when the inner edge of the seal 40 is in contact with the fixing guide 302, the seal 40 can be completely coupled to the sealing bracket 30.

The sealing bracket 30 can include a bracket insertion portion 306 coupled to the mask body 10. The bracket insertion portion 306 is inserted into a cutoff portion defined in the rear surface of the mask body 10 to cover a portion of an edge of the cutoff portion.

The cutoff portion can be understood as an opening communicating with the air duct 120 so that the air passes therethrough. The bracket insertion portion 306 can be disposed on one edge of the cutoff portion, specifically, an outer edge.

The air outlet 129 already described can be understood as the remaining portion of the cutoff portion that is not covered by the bracket insertion portion 306 in a state in which the bracket insertion portion 306 is inserted into one side of the cutoff portion.

When the bracket insertion portion 306 is inserted into or coupled to the one side of the cutoff portion to shield the one side of the cutoff portion, the air discharged from the fan modules and 17 can pass between the air duct 120 and the bracket insertion portion 306 to flow to the air outlet 129.

The bracket insertion portion 306 can serve as a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The seal 40 can be made of a material having elasticity. The seal 40 can be in close contact with the user's face and deformed to correspond to an outline of the user's face. The seal 40 can be provided in a ring shape forming a closed loop. The seal 40 can be provided to cover the user's nose and mouth.

The seal 40 includes a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a*.

The contact portion 400*b* can be a portion that is in close contact with the user's face, and the side portion 400*c* and the contact portion 400*b* can be angled at an angle of about 90 degrees or less to define a space between the side surface portion 400*c* and the contact portion 400*b*.

A first opening can be defined inside the coupling portion 400*a* of the seal 40, and a second opening can be defined inside the contact portion 400*b*. As illustrated in FIG. 3, the second opening can include a main opening in which the front of the user's nose and mouth are disposed and a sub opening extending from an upper end of the main opening and disposed on the user's nose.

In some examples, a lower portion of the main opening, that is, a portion that is in close contact with the front of the user's jaw can be designed closer to the mask body 10 than a portion that is in close contact with the front of the user's cheek.

In some implementations, a plurality of ventilation holes are defined in the contact portion 400*b* to minimize a phenomenon in which moisture is generated on the user's cheek. The plurality of ventilation holes can have different sizes, and as an example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side portion 400*c* of the seal 40.

A bracket insertion groove 401 can be defined in an end of the coupling portion 400*a* of the seal 40.

The bracket insertion groove 401 can be understood as a groove or a space defined between the two seal lips when the coupling portion 400*a* has the shape that is branched into the two seal lips as described above, and the bracket insertion portion 306 of the sealing bracket 30 is inserted into the bracket insertion groove 401.

The seal 40 includes a first mounting portion 404 on which the first body coupling portion 304 is seated, a second mounting portion 405 on which the second body coupling portion 305 is seated, and a third mounting portion 406 on which the bracket insertion portion 306 is seated.

The first and third mounting portions 404 and 406 can be understood as grooves in which a portion of the seal 40 is cut to form an accommodation space in which the first body coupling portion 304 and the bracket insertion portion 306 are accommodated. In some examples, the second mounting portion 405 can be understood as a hole in which a portion of the seal 40 is cut to pass through the second body coupling portion 305.

In another aspect, the first mounting portion 404 can be defined as a first opening, the second mounting portion 405 can be defined as a second opening, and the third mounting portion 406 can be defined as a third opening.

Figure 6:
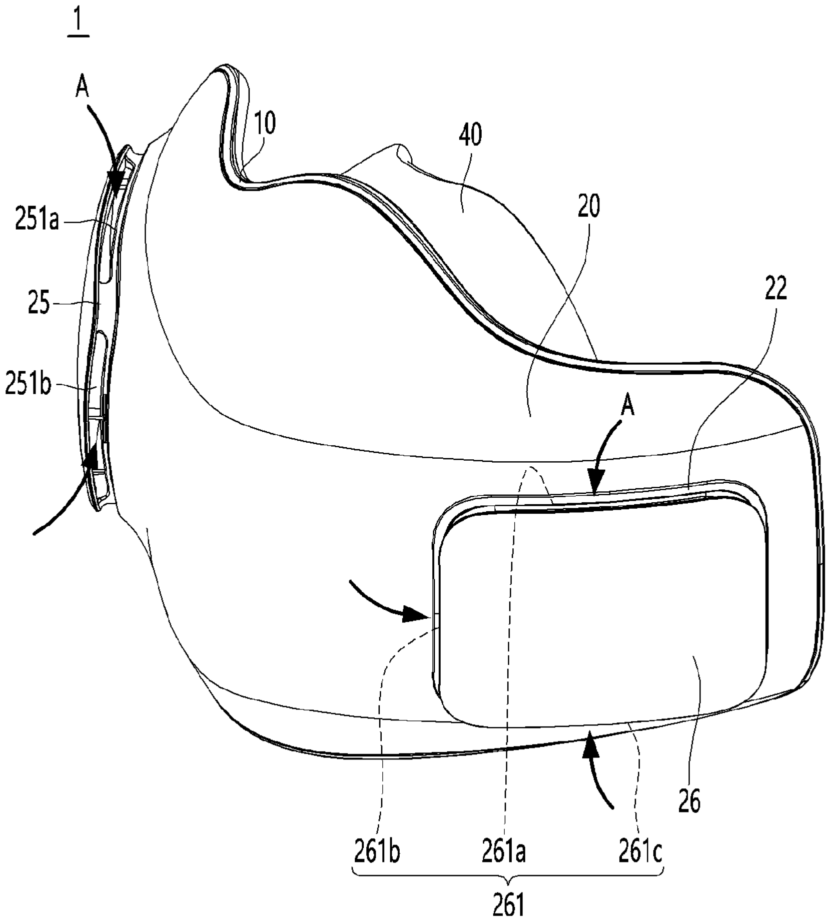
FIGS. 6 and 7 are views illustrating an example of a flow of air when the mask apparatus operates.
Figure 7:
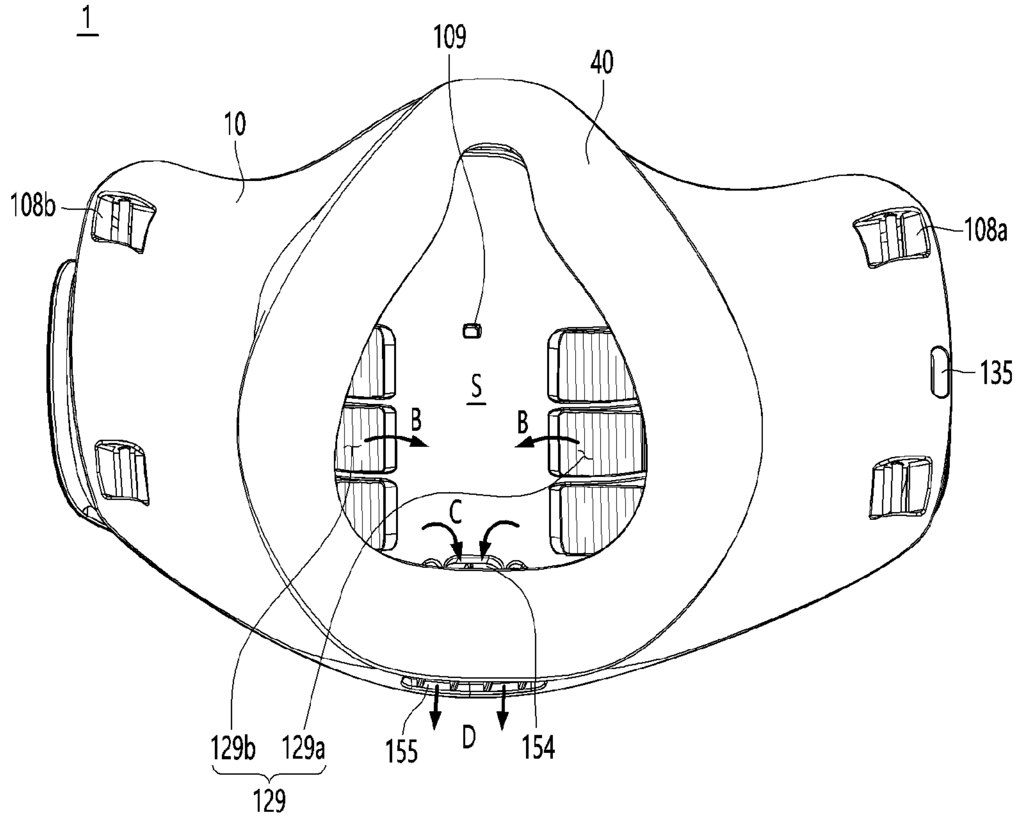

FIGS. 6 and 7 are views illustrating a flow of air when the mask apparatus operates.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by an arrow "A" Since the air inlets 251 and 261 are provided in plurality to suction the air in various directions, an inflow rate of the external air increases.

For example, the air inlets 251 and 261 can include air inlets 251*a* and 261*a* for suctioning air flowing at upper sides of the filter covers 25 and 26, air inlets 251*b* and 261*b* for suctioning air flowing at a front side of the filter covers 25 and 26, and air inlets 251*c* and 261*c* for suctioning air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the suction holes of the fan modules 16 and 17 through the air suction ports 211 and 221. Since the filter mounting portions 21 and 22 in which the air suction ports 211 and 221 are defined and the fan modules 16 and 17 are assembled in the state of being in close contact with each other, the air passing through the filter may not leak, or the external air may not be introduced between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by an arrow "B"

The breathing space S can be defined by the mask body 10 and the seal 40. When the mask body 10 is in close contact with the user's face, the seal 40 can be in close contact with the mask body 10 and the user's face to form an independent breathing space that is separated from the external space.

The user inhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by an arrow "C"

The air guided into the flow space through the first air exhaust hole 154 can be discharged to the external space through the second air exhaust hole 155. A flow direction of the air flowing to the external space through the second air exhaust hole 155 is indicated by an arrow "D."

Figure 8:
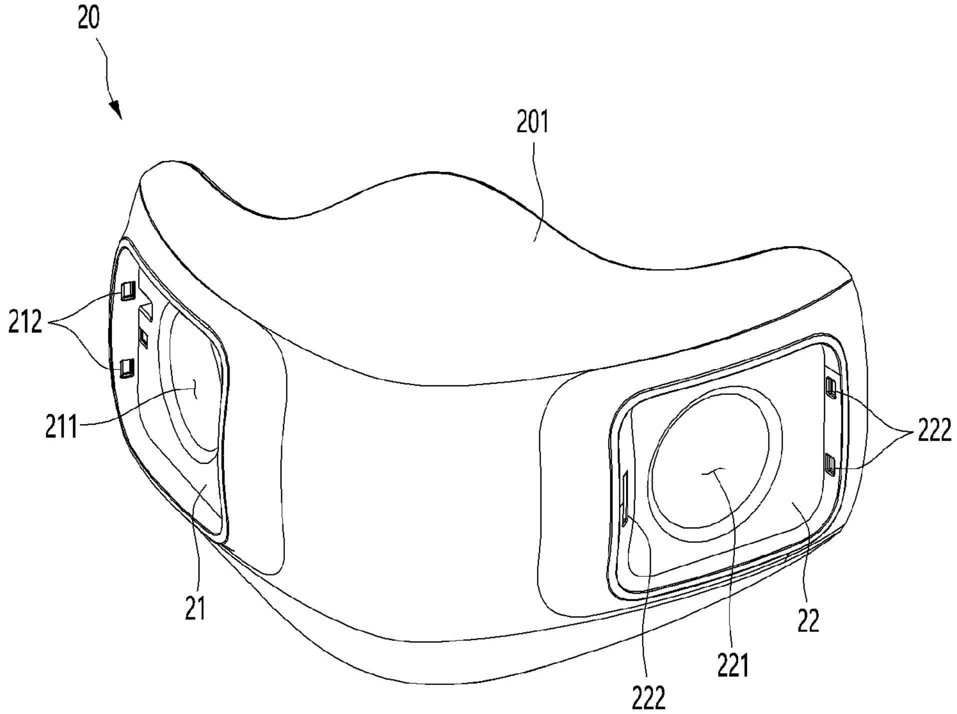
FIG. 8 is a front perspective view showing an example a mask body cover of the mask apparatus.
Figure 9:
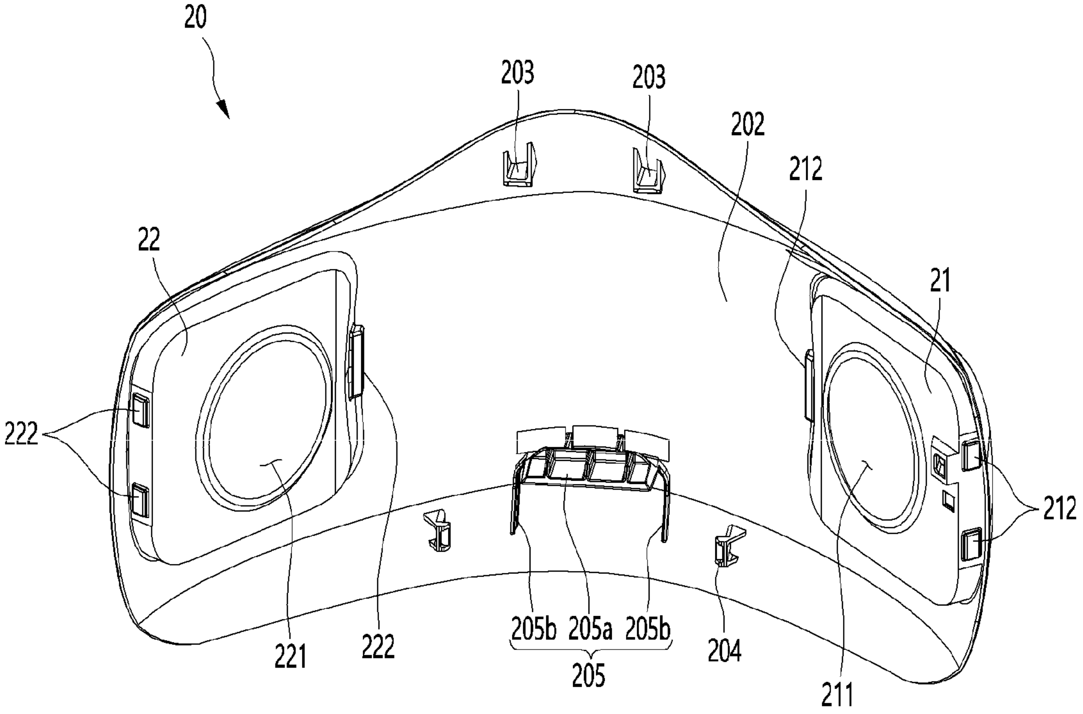
FIG. 9 is a rear perspective view showing the mask body cover.

FIG. 8 is a front perspective view showing the mask body cover, and FIG. 9 is a rear perspective view showing the mask body cover.

Referring to FIGS. 8 and 9, the mask body cover 20 can be coupled to the front of the mask body 10. The mask body cover 20 can extend in the left and right direction, and a center portion of the mask body cover 20 can be convexly rounded forward. In some examples, the mask body cover 20 can be provided to be symmetrical to each other in the left and right direction with respect to a vertical surface passing through a center of the front surface thereof.

The mask body cover 20 can include a cover front surface 201 defining an outer surface or a front surface thereof, and a cover rear surface 202 defining an inner surface or a rear surface thereof.

The cover front surface 201 can be a portion that is exposed to the outside to define an outer appearance thereof when the user wears the mask apparatus 1. The cover front surface 201 can include a first filter mounting portion 21 on which the first filter 23 is mounted and a second filter mounting portion 22 on which the second filter 24 is mounted.

The first filter mounting portion 21 and the second filter mounting portion 22 can be provided to be symmetrical to each other in the left and right direction with respect to the center of the front surface 201 of the cover. The first filter mounting portion 21 and the second filter mounting portion 22 can have the same or similar shape to each other.

In some implementations, the first filter mounting portion 21 and the second filter mounting portion 22 can be provided by partially recessing the front surface 201 of the cover. For example, in the first filter mounting portion 21 and the second filter mounting portion 22, a portion of the front surface 201 of the cover can be recessed backward to define a space in which the first filter 23 and the second filter 24 are seated.

Thus, each of the first filter mounting portion 21 and the second filter mounting portion 22 can have a bottom surface, on which the first filter 23 and the second filter 24 contact and are supported, and a plurality of side surfaces defining edges of the bottom surface.

A first air suction port 211 through which external air is suctioned can be defined in the bottom surface of the first filter mounting portion 21. The air passing through the first filter 23 can be suctioned into the first fan module 16 through the first air suction port 211.

The first air suction port 211 can be disposed at a center of the bottom surface. For example, the first air suction port 211 can be provided to be opened in a circular shape.

At least one or more first filter cover mounting grooves 212 for mounting the first filter cover 25 can be defined in the side surfaces of the first filter mounting portion 21.

The first filter cover mounting groove 212 can be defined by being further recessed inward from the side surface of the first filter mounting portion 21. Thus, the coupling protrusion 262 protruding from the edge of the first filter cover 25 can be fitted and coupled to the first filter cover mounting groove 212 and then be mounted on the first filter mounting portion 21.

In some implementations, the first filter cover mounting groove 212 can be defined in each of two side surfaces of the first filter mounting portion 21 facing each other, among the side surfaces of the first filter mounting portion 21. In detail, the first filter cover mounting groove 212 can include one or a plurality of mounting grooves defined in one of the two side surfaces facing each other and one or a plurality of mounting grooves defined in the other of the two side surfaces.

In some examples, at least one of the side surfaces of the first filter mounting portion 21, i.e., one of the two side surfaces, in which the first filter cover mounting groove is defined, can be provided to be inclined. For example, among the side surfaces of the first filter mounting portion 21, a side adjacent to a front center of the mask body cover 20 can be provided to be gradually inclined in a direction that is close to the front center of the mask body cover 20, as it goes from the rear surface of the mask body cover 20 towards the front surface of the mask body cover 20.

The reason in which at least one of the side surfaces of the first filter mounting portion 21 is provided to be inclined is to facilitate attachment/detachment of the first filter cover 25. That is, when the side in which the first filter cover mounting groove 212 is defined is provided to be inclined, in a state in which the coupling protrusion 262 protruding from one side end of the first filter cover 25 is inserted into the first filter cover mounting groove 212, the coupling protrusion 262 protruding from the other side end of the first filter cover (24) can be inserted into the first cover mounting groove 212 which is formed in the inclined side surface, while the other side end of the first filter cover 25 is slid along the inclined side surface.

Likewise, a second air suction port 221 through which external air is suctioned can be defined in the bottom surface of the second filter mounting portion 22. The air passing through the second filter 24 can be suctioned into the second fan module 17 through the second air suction port 221.

The second air suction port 221 can be disposed at a center of the bottom surface. For example, the second air suction port 221 can be provided to be opened in a circular shape.

At least one or more second filter cover mounting grooves 222 for mounting the second filter cover 26 can be defined in side surfaces of the second filter mounting portion 22.

Since the second filter mounting portion 22 has a shape that is symmetrical to the shape of the first filter mounting portion 21, duplicated descriptions of the second filter mounting portion 22 will be omitted.

In some examples, the cover rear surface 202 is coupled to cover the entire surface of the mask body 10 and serves to protect a plurality of components mounted on the mask body 10.

A plurality of coupling ribs for coupling to the mask body 10 can be disposed on the rear surface 202 of the cover. The plurality of coupling ribs can be provided to protrude backward from the cover rear surface 202.

The plurality of coupling ribs can include a first coupling rib 203 provided at an upper portion of the cover rear surface 202 and a second coupling rib 204 provided at a lower portion of the cover rear surface 202.

The first coupling rib 203 can be fitted and coupled to the first cover coupling portion 102 provided on the mask body 10. The first coupling ribs 203 can be provided in plurality so as to be spaced apart from an upper portion of the cover rear surface 202 to both sides.

The second coupling rib 204 can be fitted and coupled to the second cover coupling portion 106 provided on the mask body 10. The second coupling ribs 204 can be plurality in plurality so as to be spaced apart from an upper portion of the cover rear surface 202 to both sides.

In this case, an interval between the plurality of second coupling ribs 204 can be greater than that between the plurality of first coupling ribs 203.

The plurality of coupling ribs can further include a third coupling rib 205 provided at a lower portion of the cover rear surface 202. The third coupling rib 205 can be fitted and coupled to the air outlet 150 provided in the mask body 10. The third coupling rib 205 can be provided between the plurality of second coupling ribs 204.

The third coupling rib 205 includes a horizontal rib **205*a* protruding horizontally backward from the cover rear surface 202 and vertical ribs 205*b* extending downward from both sides of the horizontal rib 205*a***.

Here, the air outlet 150 can be coupled to surround outer edges of the horizontal rib **205*a* and the vertical ribs 205*b*. In detail, at least a portion of the third coupling rib 205 can be coupled in close contact with the inner side of the air outlet 150. Thus, bonding force between the mask body 10 and the mask body cover 20** can be further improved.

Figure 10:
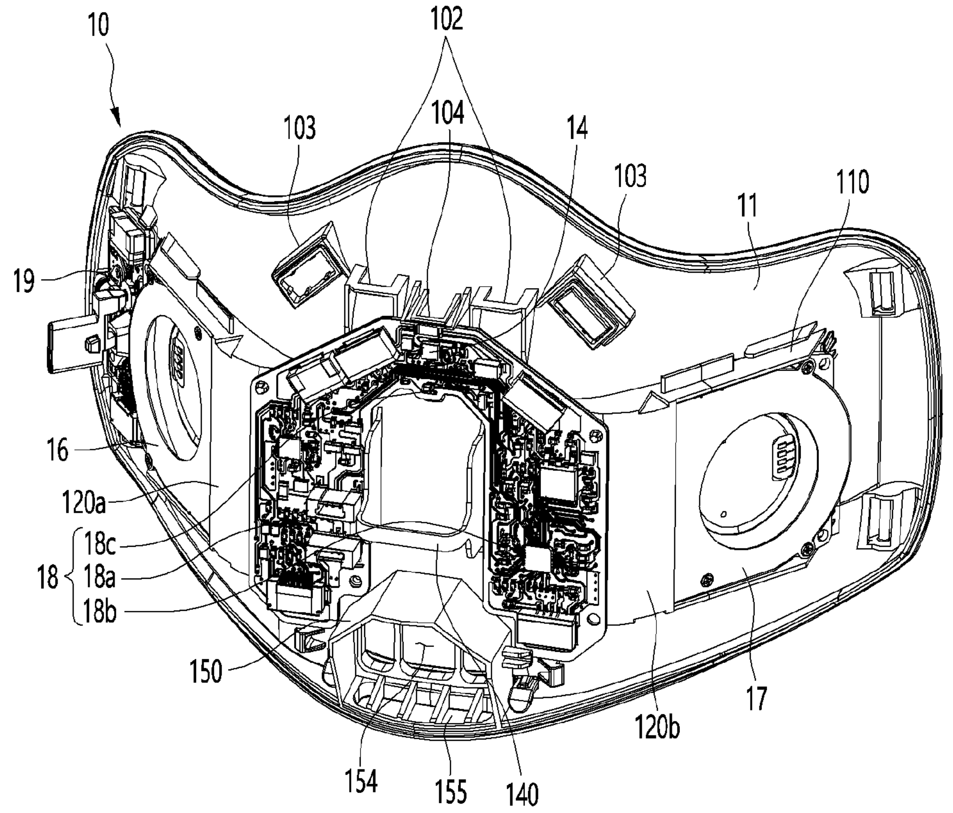
FIG. 10 is a front perspective view showing the mask apparatus, from which the mask body cover and a battery are removed.
Figure 11:
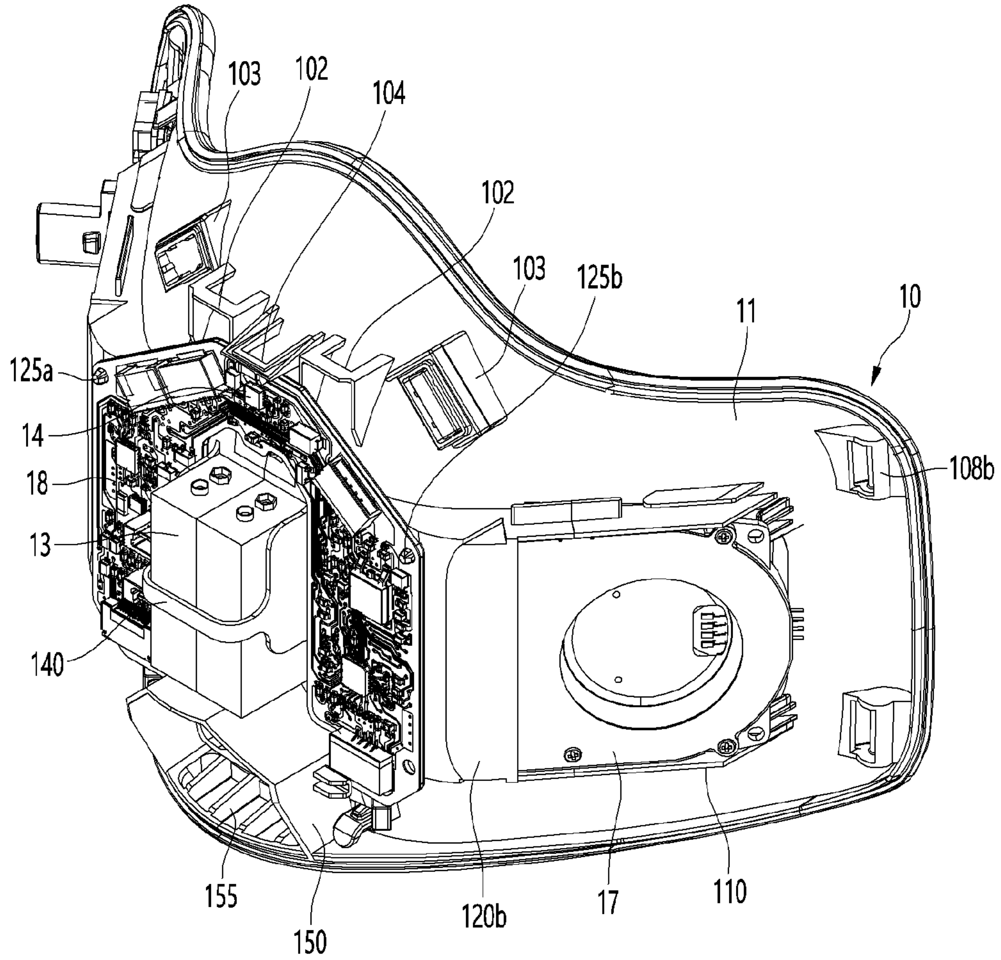
FIG. 11 is a left perspective view of the mask apparatus, from which the mask body cover is removed.
Figure 12:
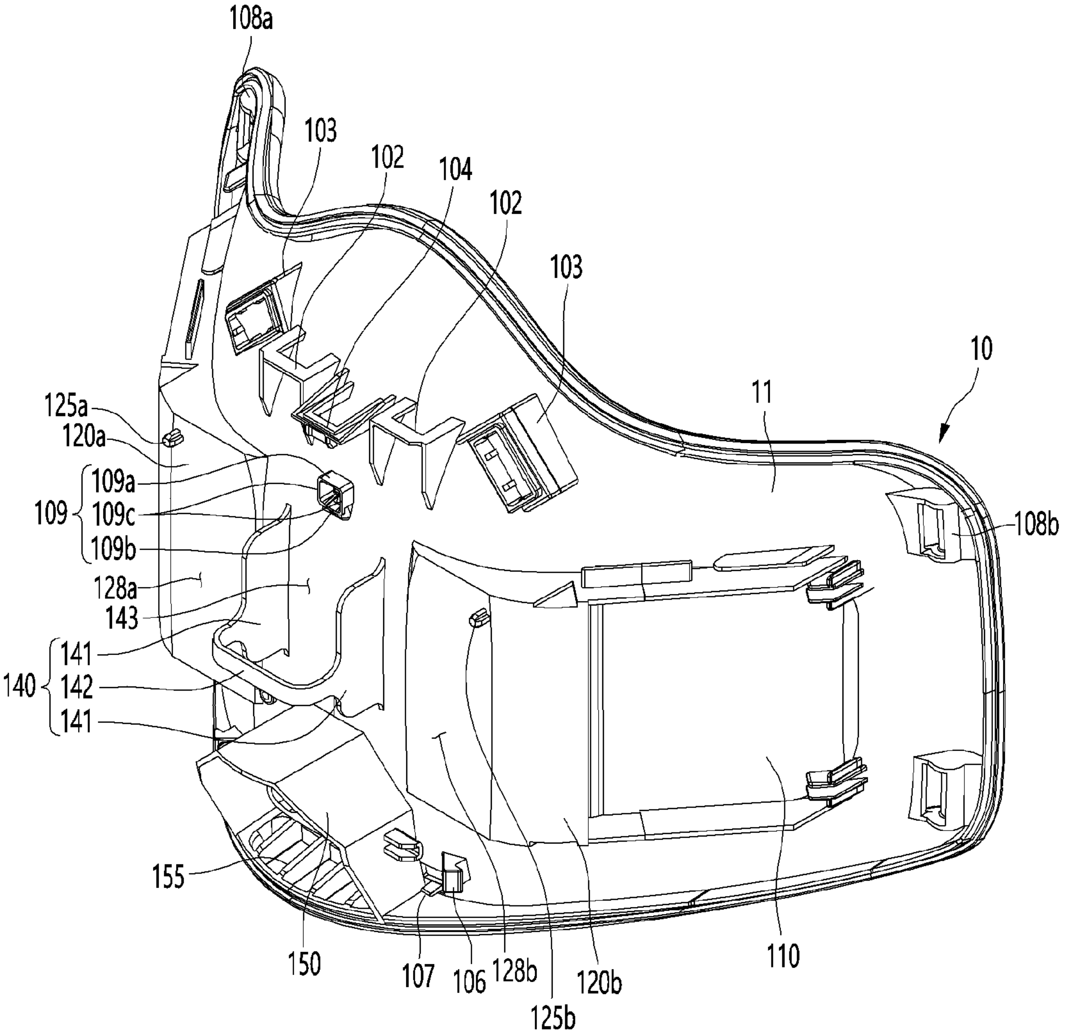
FIG. 12 is a left perspective view showing an example of a mask body of the mask apparatus.

FIG. 10 is a front perspective view showing the mask apparatus, from which the mask body cover and a battery are removed, FIG. 11 is a left perspective view showing the mask apparatus, from which the mask body cover is removed, FIG. 12 is a left perspective view of the mask body, and FIG. 13 is a rear perspective view showing the mask body.

Referring to FIGS. 10 to 13, the mask apparatus 1 includes a mask body 10 on which a plurality of electronic components are installed, and a mask body cover 20 detachably coupled to the mask body 10. The mask body cover 20 can cover the plurality of electronic components mounted on the mask body 10 to help to prevent the plurality of electronic components from being exposed to the outside.

In some examples, when the mask body cover 20 is separated from the mask body 10, the entire surface of the mask body 10 can be exposed as illustrated in FIG. 10.

The mask body 10 can be coupled to the rear of the mask body cover 20. The mask body 10 can be provided to extend in the left and right direction, and a center portion of the mask body 10 can be convexly rounded forward. In some examples, like the mask body cover 20, the mask body 10 can be provided symmetrically in a horizontal direction with respect to the vertical surface passing through the center. That is, the mask body 10 can have a shape and size corresponding to the mask body cover 20.

The mask body 10 can include a body front surface 11 coupled to the mask body cover 20 and a body rear surface 12 coupled to the sealing bracket 30 or the seal 40.

The body front surface 11 defines a space in which the plurality of electronic components are installed, and a plurality of structures coupled with the mask body cover 20 are provided.

Particularly, a battery 13 is disposed at the center of the body front surface 11. The battery 13 can supply power to at least one of the control module 18, the power module 19, or the fan modules 16 and 17.

The battery 13 can have sufficient capacity to enable high-speed rotation of the fan modules 16 and 17. For example, two batteries, each of which has a capacity of 400 mAh, can be connected to each other in series. Alternatively, the battery 13 can be provided with one large-capacity battery.

The battery 13 can be relatively heavy among the electronic components. Thus, the battery 13 can be disposed at a central portion of the mask body 10 hung on the user's nose. In some examples, since the battery 13 is disposed at the center of the mask apparatus 1, the user can feel less load on his/her ears when wearing the mask apparatus 1, when compared to a case in which the battery 13 is disposed at the side edge of the mask body 10.

In some implementations, since the battery 13 is disposed at the center of the mask body 10, power can be easily provided to all of the control module 18, the power module 19, and the fan modules 16 and 17. That is, there is an advantage of being able to easily connect wires to various electronic components and provide power to the components.

In some implementations, a battery mounting portion 140 supporting the battery 13 is disposed at the central portion of the body front surface 11. The battery mounting portion 140 can have a rib shape protruding forward from the body front surface 11.

In some examples, the battery mounting portion 140 can include a pair of vertical ribs 141 disposed to extend in the vertical direction on the body front surface 11 and a horizontal rib 142 connecting the pair of vertical ribs 141 to each other.

The pair of vertical ribs 141 can be provided to be spaced apart from each other in the left and right direction so as to be symmetrical to each other with respect to the center of the body front surface 11. In some examples, each front end of the pair of vertical ribs 141 can be bent in a direction facing each other to provide the horizontal ribs 142. Thus, the pair of vertical ribs 141 and horizontal ribs 142 can define a battery accommodation space 143 in which the battery 13 is accommodated.

When the battery 13 is accommodated in the accommodation space 143, a front surface of the battery 13 can be supported by the horizontal ribs 142, and a side surface of the battery 13 can be supported by the vertical ribs 141. In some examples, a lower end of the battery 13 can be supported by an upper end of the air outlet 150. In some examples, the battery 13 can be restricted from being removed from the battery mounting portion 140, and the battery 13 can be stably supported.

In some examples, a control module 18 is disposed at a center of the body front surface 11. The control module 18 can be electrically connected to the power module 19, the fan modules 16 and 17, and the battery 13. The control module 18 can be seated on the front surface of the air duct 120 through which air suctioned from the fan modules 16 and 17 flows and can be cooled by air flowing along the air duct 120. That is, heat generated in the control module 18 can be transferred to the air flowing along the air duct 120 through heat conduction between the front surface of the air duct 120 and the control module 18.

The control module 18 can be disposed to surround the battery 13. Here, the central portion of the control module 18 can be opened, and the battery 13 can be disposed at the opened center of the control module 18.

The control module 18 can have an n-shape with an opened central portion to avoid an interference with the battery 13. For example, the control module 18 can be provided as an n-shaped single substrate, or a plurality of substrates 18*a*, 18*b*, and 18*c* can be connected to each other to define the n-shape.

Particularly, the substrate constituting the control module 18 can include a first substrate 18*a* disposed at a right side and a second substrate 18*b* disposed on at left side with respect to the body front surface 11, the substrate constituting the control module 18 can further include a third substrate 18*c* connecting the first substrate 18*a* to the second substrate 18*b*. The first substrate 18*a*, the second substrate 18*b*, and the third substrate 18*c* can be integrated with each other.

The first substrate 18*a* can be disposed at a right side of the battery 13, the second substrate 18*b* can be disposed at a left side of the battery 13, and the third substrate 18*c* can be disposed above the battery 13. The third substrate 18*c* can be disposed to avoid overlapping with the battery 13. Thus, the battery 13 and the control module 18 can be efficiently and densely disposed within a limited space.

Control module mounting portions 128*a* and 128*b* on which the control module 18 is mounted are disposed on the body front surface 11. The control module mounting portions 128*a* and 128*b* can be provided so that a portion of the front surface of the air duct 120 is provided in a plane.

Coupling portions 125*a* and 125*b* for coupling the substrates 18*a*, 18*b*, and 18*c* of the control module 18 are disposed on the control module mounting portions 128*a* and 128*b*. The plurality of coupling portions 125*a* and 125*b* can be disposed on the first control module mounting portion 128*a* and the second control module mounting portion 128*b*, respectively.

As an example, the plurality of coupling portions 125*a*, 125*b* pass through portions of edges of the substrates 18*a*, 18*b*, 18*c*, respectively, so that the control module 18 is fixed to the control module mounting portions 128*a*, 128*b*. Alternatively, a separate coupling member can pass through the substrates 18*a*, 18*b*, and 18*c* to be coupled to the control module mounting portions 128*a* and 128*b*.

In some examples, the first substrate 18*a* can be disposed on the first control module mounting portion 128*a* of the air duct 120, and the second substrate 18*b* can be disposed on the second control module mounting portion 128*b* of the air duct 120, and the third substrate 18*c* can be disposed above the air duct 120. Thus, the air suctioned from the first fan module 16 and the second fan module 17 can pass through the air duct 120 to cool the first substrate 18*a*, the second substrate 18*b*, and the third substrate 18*c*.

The mask apparatus 1 further includes a pressure sensor 14. The pressure sensor 14 can be disposed on a sensor mounting portion 109 disposed on the body front surface 11 to sense a pressure of the breathing space S.

The pressure sensor 14 can be installed on the substrate of the control module 18 to be disposed in an installation space defined inside the sensor mounting portion 109. For example, the pressure sensor 14 can be installed on the third substrate 18*c* to protrude to the rear of the third substrate 18*c*. For this, the third substrate 18*c* can be disposed in front of the sensor mounting portion 109.

When the pressure sensor 14 is disposed in the installation space of the sensor mounting portion 109, information of the breathing space can be obtained from air introduced into the installation space through a hole communicating with the installation space and the breathing space.

Pressure information or breathing information sensed by the pressure sensor 14 can be provided to the control module 18, and operations of the fan modules 16 and 17 can be controlled based on the pressure information and breathing information.

The sensor mounting portion 109 can have a rectangular shape of which the inside is empty, but is not limited thereto.

As an example, the sensor mounting portion 109 can include a first portion 109*a* having a predetermined width and protruding in a direction parallel to the ground, a pair of second portions 109*c* extending downward from each of both sides of the first portion 109*a*, and a third portion 109*b* connecting ends of the pair of second portions 109*c* to each other.

The first portion 109*a* can define a top surface of the sensor mounting portion 109, the second portion 109*c* can define both side surfaces of the sensor mounting portion 109, and the third portion 109*b* can define a bottom surface of the sensor mounting portion 109.

The first fan module 16 and the second fan module 17 are disposed on both sides of the body front surface 11, respectively. The first fan module 16 can be disposed at a right side of the control circuit 18, and the second fan module 17 can be disposed at a left side of the control circuit 18.

The first fan module 16 is mounted on a first fan module mounting portion 110*a* disposed at the right side of the body front surface 11, and the second fan module 17 is mounted on a second fan module mounting portion 110*b* disposed at the left side of the body front surface 11. The first fan module 16 and the second fan module 17 can be disposed to be symmetrical to each other in the left and right direction with respect to the center of the mask body 10.

The power module 19 can be disposed on the edge of the body front surface 11. The power module 19 can receive power from a power source to perform a function of turning on or off the power of the mask apparatus 1. The power module 19 can be disposed on a side of any one of the first fan module 16 and the second fan module 17. That is, the power module 19 can be disposed on a left edge or a right edge of the body front surface 11.

A power module mounting portion 130 for mounting the power module 19 is disposed on the body front surface 11. The power module mounting portion 130 can include a plurality of ribs, which are disposed on the left edge or the right edge of the body front surface 11 to support the power module 19.

The battery 13, the control module 18, the fan modules 16 and 17, and the power module 19 can be arranged in a line in a width direction of the mask body 10.

Hereinafter, the structure and location of the pressure sensor will be described in detail with reference to the drawings.

Figure 14:
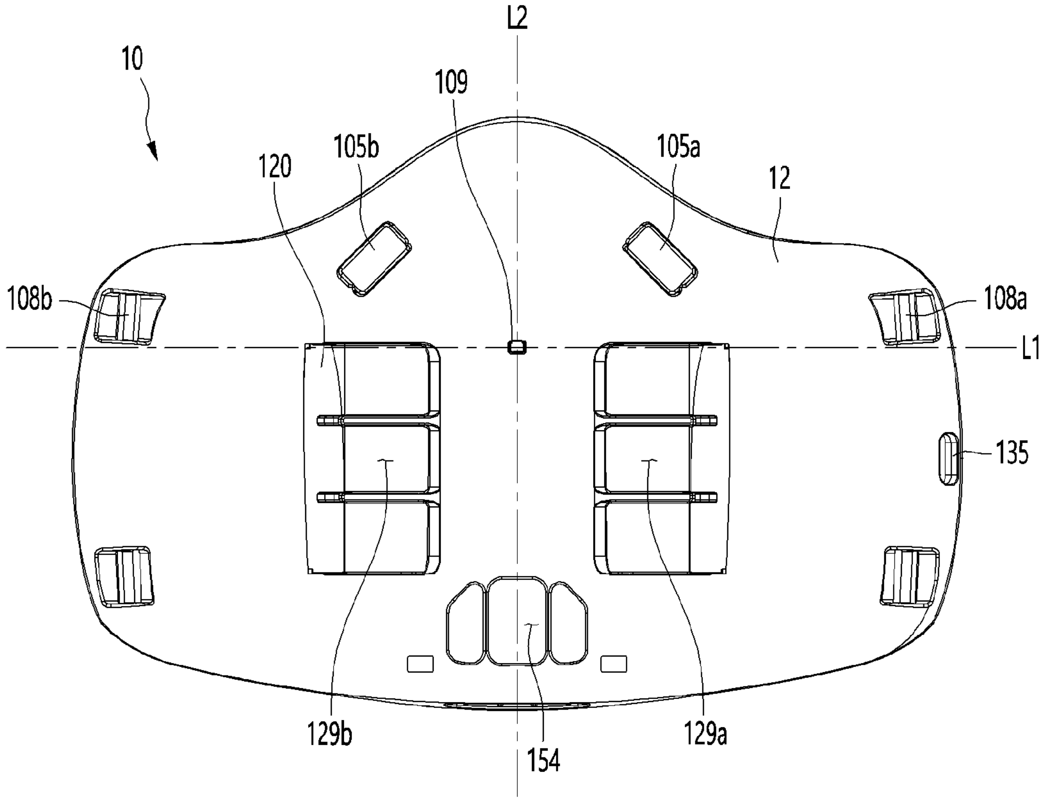
FIG. 14 is a rear view showing the mask apparatus.
Figure 15:
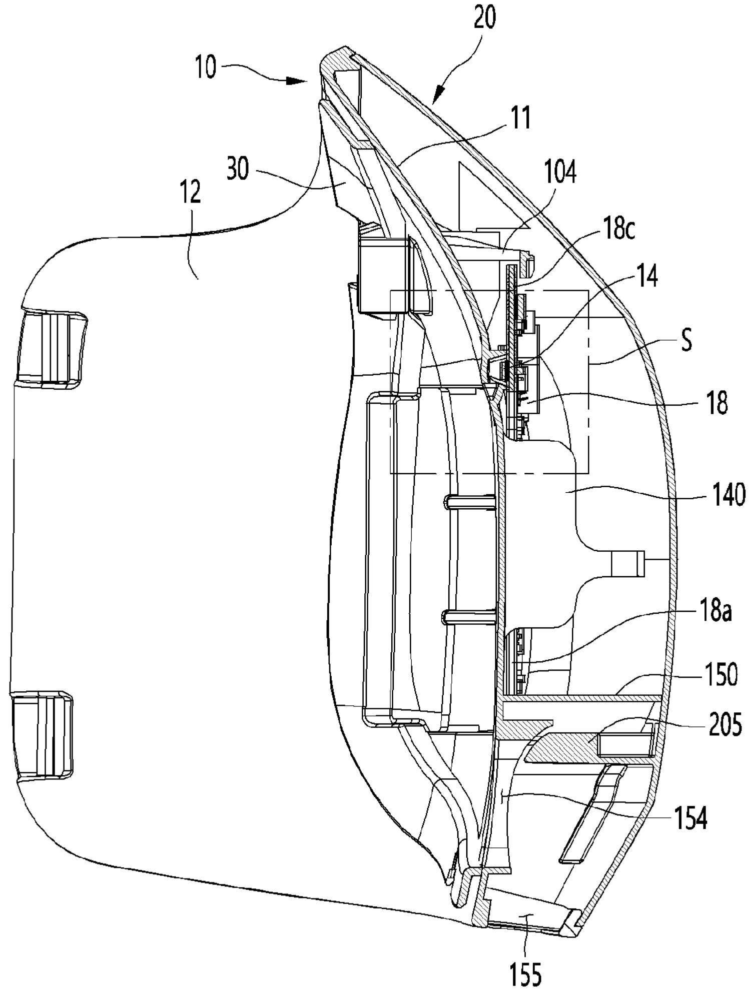
FIG. 15 is a longitudinal cross-sectional view of the mask apparatus.
Figure 16:
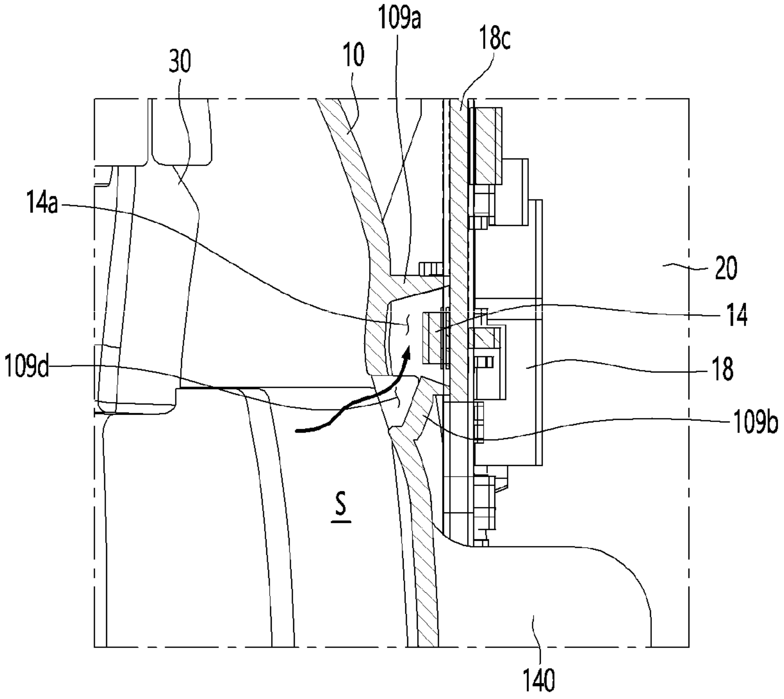
FIG. 16 is an enlarged view illustrating a portion "S" of FIG. 15.

FIG. 14 is a rear view showing the mask apparatus, FIG. 15 is a longitudinal cross-sectional view of the mask apparatus, and FIG. 16 is an enlarged view illustrating a portion "S" of FIG. 15.

Referring to FIGS. 14 to 16, the pressure sensor 14 can be mounted on a sensor mounting portion 109 disposed on the front surface of the mask body 10. At least a portion of the pressure sensor 14 can be disposed in an installation space 14*a* defined inside the sensor mounting portion 109 to sense a pressure of the breathing space.

Here, the pressure of the breathing space can be understood as an inner pressure of the mask apparatus.

At least a portion of the installation space 14*a* can be defined through the mask body 10. In some examples, one surface (front surface) of the installation space 14*a* can be opened to accommodate the pressure sensor 14, and the other surface (rear or bottom surface) can be opened to communicate with the breathing space S of the mask apparatus 1.

The pressure sensor 14 can be an air pressure sensor that measures a pressure or air pressure in a sealed space using a flow rate or wind strength of introduced air. Alternatively, the pressure sensor 14 can be a differential pressure sensor that measures a pressure change in a sealed space.

In some implementations, a communication hole 109*d* connecting the installation space 14*a* of the sensor mounting portion 109 and the breathing space can be defined in the other surface of the sensor mounting portion 109.

The communication hole 109*d* can be defined by passing through the mask body 10 so as to connect the installation space 14*a* of the sensor mounting portion 109 to the breathing space. In some examples, the sensor mounting portion 109 can be disposed in such a manner the ribs protrude along the communication hole 109*d* or the edge of the installation space 14*a*.

The communication hole 109*d* can be defined by cutting a portion of the mask body 10. Thus, a portion of the air discharged to the breathing space can be introduced into the installation space 14*a* in which the pressure sensor 14 is disposed through the communication hole 109*d*.

When the mask apparatus 1 is worn, the communication hole 109*d* can be disposed adjacent to the user's nose or mouth. For example, the communication hole 109*d* can be designed to be placed at a point facing a user's philtrum.

Since the pressure sensor 14 is disposed at the position adjacent to the user's nose or mouth, it is possible to accurately sense a pressure change caused by air exhaled from the nose or mouth.

If the communication hole 109*d* or the pressure sensor 14 is disposed at a too high or too low position with respect to the user's nose or mouth, there is a limitation in that the pressure change due to the exhaled air is not accurately sensed. For example, the communication hole 109*d* or the pressure sensor 14 can be disposed at a point corresponding to or facing the philtrum between the nose and the mouth of the user.

For example, the communication hole 109*d* can be disposed at an intermediate point between the first air outlet 129*a* and the second air outlet 129*b* provided in the rear surface of the mask body 10. Particularly, the communication hole 109*d* can be disposed at a point corresponding to a first reference line L1 connecting upper ends of the first air outlet 129*a* and the second air outlet 129*b* to each other.

In some examples, the communication hole 109*d* can be disposed at a point corresponding to a vertical second reference line L2 that equally divides the mask body 10 horizontally. The communication hole 109*d* can be disposed at a point at which the first reference line L1 and the second reference line L2 meet each other.

The communication hole 109*d* can be defined at a point lower than a height of the sensor mounting portion 109. That is, the communication hole 109*d* can be connected to a lower portion of the installation space 14*a* of the sensor mounting portion 109 to avoid a direct flow of air from the breathing space into the pressure sensor 14.

If, when breathing and snorting from the user's mouth or nose directly flows into the pressure sensor 14, water vapor contained in the breath and snort can be in direct contact with the pressure sensor 14 to cause fogging.

When the fogging occurs on the pressure sensor 14, an ambient humidity of the pressure sensor 14 can increase, and as a result, moisture can be permeated into the pressure sensor 14 to deteriorate reliability of the sensor.

In some examples, the pressure sensor 14 can be disposed at a point higher than the communication hole 109*d* so that the breathing and snorting is not directly directed to the pressure sensor 14 when the user breathes. As a result, the air exhaled by the user can flow upward along the communication hole 109*d* to reach the pressure sensor 14.

In some examples, since an air passage from the breathing space of the mask toward the pressure sensor 14 is provided upward from a lower side, a phenomenon in which moisture or saliva contained in the air from the user's mouth or nose can flow into the pressure sensor 14 can be minimized to help to prevent the pressure sensor 14 from being contaminated or wetted.

The installation space 14*a* of the sensor mounting portion 109 and the communication hole 109*d* can be referred to as an "opening."

In addition, the installation space 14*a* can be referred to as a "first space," and the communication hole 109*d* can be referred to as a "second space." That is, the first space can be understood as a space in which the pressure sensor 14 is disposed, and the second space can be understood as a passage connecting the first space to the breathing space. The first space is disposed at a point higher than the second space.

The rear surface (or bottom surface) of the sensor mounting portion 109 can face the pressure sensor 14, and a portion of the rear surface can be cut to define the communication hole 109*d*.

Each of the first portion 109*a*, the second portion 109*c*, and the third portion 109*b* can protrude forward from the front surface of the mask body 10. Here, lengths of the first portion 109*a*, the second portion 109*c*, and the third portion 109*b*, which protrude forward, can be the same, but are not limited thereto.

Thus, when the control module 18 is installed on the mask body 10, the rear surface of the control module 18 can be seated on a front end of each of the first portion 109*a*, the second portion 109*c*, and the third portion 109*b*, and thus, the opened front surface of the sensor mounting portion 109 can be completely shielded by the control module 18. Here, the pressure sensor 14 mounted on the rear surface of the control module 18 can be disposed in the installation space 14*a* of the sensor mounting portion 109.

In some implementations, the pressure sensor 14 can be stably installed in the mask body 10. In some examples, since the inner space and the breathing space S, which are defined by the mask body 10 and the mask body cover 20 are divided by the substrate constituting the control module 18, the pressure of the breathing space can be accurately measured.

To minimize an influence of wind discharged from the fan modules 16 and 17 on the pressure sensor 14, the pressure sensor 14 can be disposed to be as far apart as possible from the fan modules 16 and 17.

The reason in which the pressure sensor 14 is maximally spaced apart from the discharge hole of the fan modules 16 and 17 is because a flow speed of air suctioned by the fan modules 16 and 17 is high. In detail, when the pressure sensor 14 is installed at the position that is close to the discharge hole of the fan modules 16 and 17, it is difficult to allow the pressure sensor 14 to accurately measure the air pressure inside the suction space S. Thus, the pressure sensor 14 can be disposed at the intermediate point between the first fan module 16 and the second fan module 17.

The pressure sensor 14 can be disposed at the intermediate point between the first air outlet 129*a* and the second air outlet 129*b*, which are provided in the rear surface of the mask body 10.

Particularly, like the communication hole 109*d*, the pressure sensor 14 can be disposed on an area corresponding to the first reference line L1 connecting the upper ends of the first air outlet 129*a* and the second air outlet 129*b* to each other.

In some examples, the pressure sensor 14 can be disposed on an area corresponding to a vertical second reference line L2 that equally divides the mask body 10 horizontally. The pressure sensor 14 can be disposed on an area on which the first reference line L1 and the second reference line L2 meet each other.

That is, the pressure sensor 14 can be disposed at a point that is spaced a predetermined distance upward from the center of the mask apparatus 1. Here, when the user wears the mask apparatus 1, the pressure sensor 14 can be disposed at a portion adjacent to the user's nose.

In some examples, since the pressure sensor 14 is maximally spaced apart from the fan modules 16 and 17 and is disposed adjacent to the user's nose, the pressure inside the mask (pressure of the breathing space) according to the user's breathing state can be accurately sensed.

At least a portion of the sensor mounting portion 109 can be inclined. For example, the third portion 109*b* can be inclined toward the inside of the installation space 14*a*.

Particularly, the third portion 109*b* can extend to be inclined upward from the front surface of the mask body 10. When the third portion 109*b* extends to be inclined upward, a cross-sectional area (width) of the passage of the communication hole 109*d* connecting the installation space 14*a* of the sensor mounting portion 109 to the breathing space can be narrowed. When the cross-sectional area of the passage of the communication hole 109*d* is narrowed, the direct flow of air from the user's nose to the pressure sensor 14 can be minimized to improve sensing accuracy of the pressure sensor 14.

In some examples, since a portion of the sensor mounting portion 109 is inclined, the passage of the communication hole 109*d* can be inclined. That is, a flow direction of the air introduced to the pressure sensor 14 can be changed to avoid a direct flow of air discharged from the nose into the pressure sensor 14.

In some examples, a portion of an upper portion of the rear surface (bottom surface) of the sensor mounting portion 109 can be cut, and the first portion 109*a* can extend to be inclined downward from the front surface of the mask body 10. In this case, the pressure sensor 14 can be disposed at a point lower than the communication hole 109*d*.

Particularly, when the first portion 109*a* extends to be inclined downwardly, the cross-sectional area (width) of the passage of the communication hole 109*d* connecting the installation space 14*a* of the sensor mounting portion 109 to the breathing space can be narrowed.

In some examples, since the air passage from the breathing space S toward the pressure sensor 14 is inclined downward from an upper side, the flow direction of the air flowing into the pressure sensor 14 can be changed.

Hereinafter, a method of controlling a fan module using a pressure sensor will be described in detail with reference to the drawings.

Figure 17:
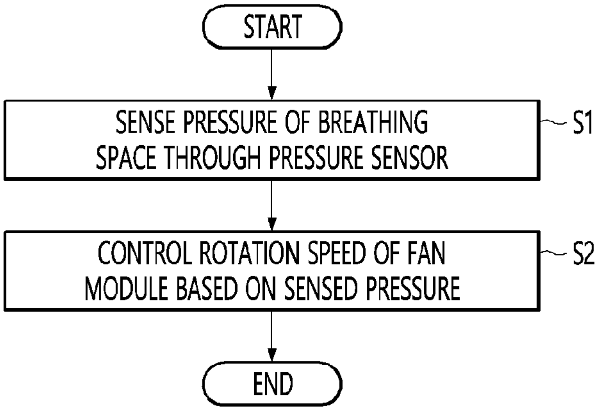
FIG. 17 is a flowchart illustrating an example of a method for controlling a mask apparatus.

FIG. 17 is a flowchart illustrating an example of a method for controlling a mask apparatus.

Referring to FIG. 17, a mask apparatus 1 senses a pressure of a breathing space S through a pressure sensor 14 (S1). Then, a rotation speed of each of the fan modules 16 and 17 is controlled based on the sensed pressure (S2).

Figure 18:
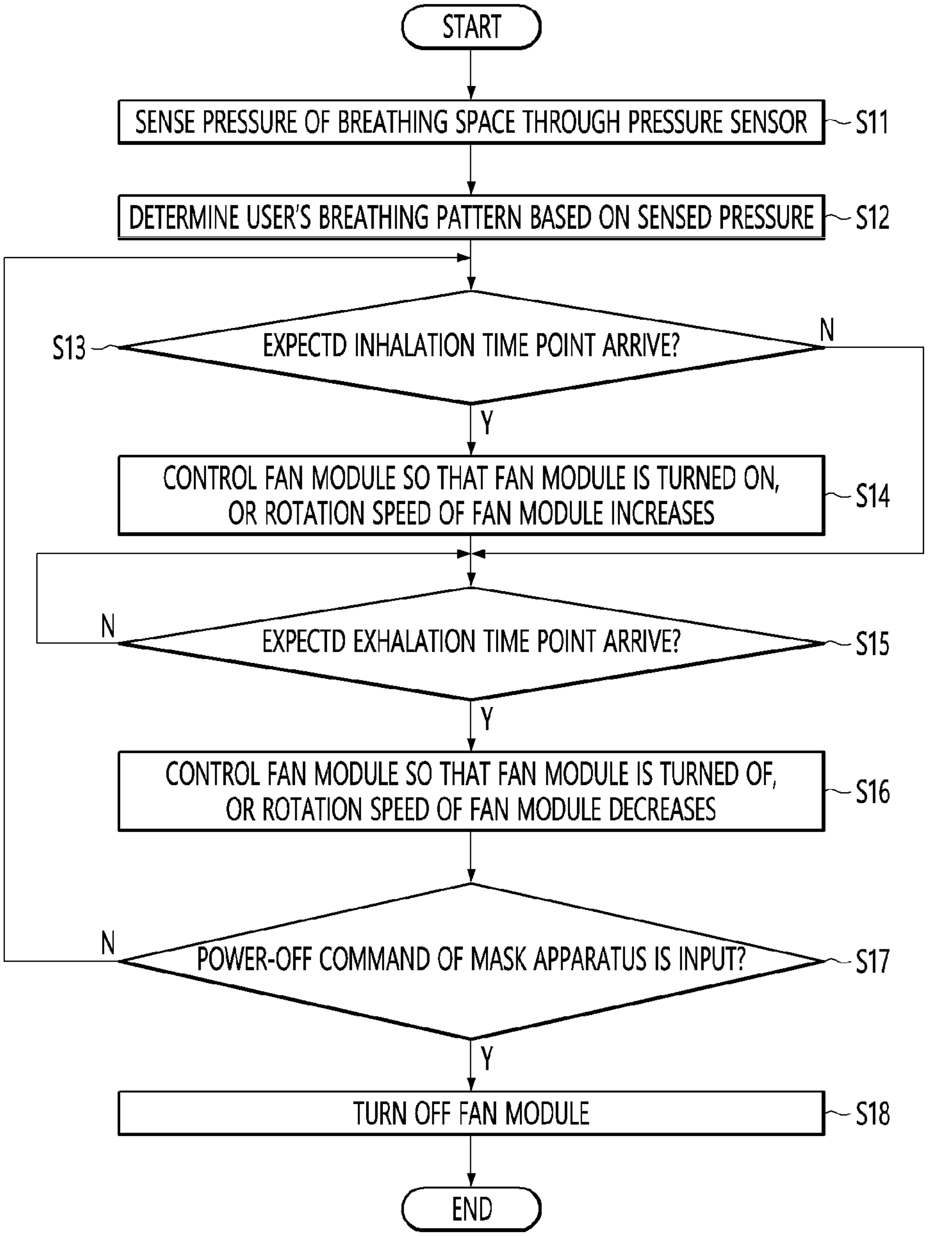
FIG. 18 is a flowchart illustrating an example of a method for controlling a fan module of the mask apparatus.
Figure 19:
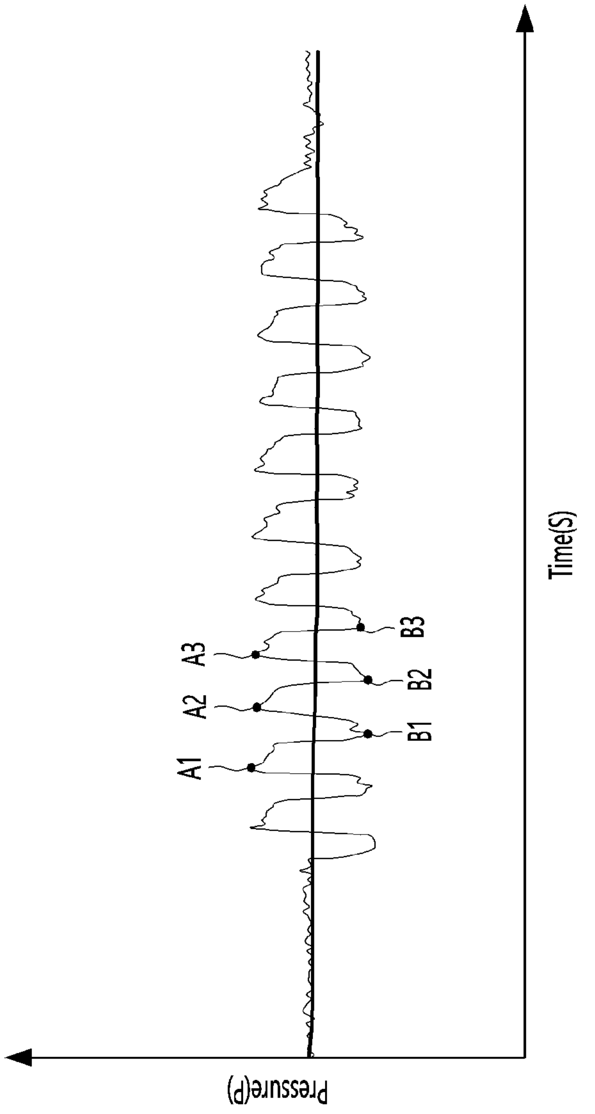
FIG. 19 is a graph illustrating an example of a change in pressure of a breathing space, which is sensed by a pressure sensor.

FIG. 18 is a flowchart illustrating an example of a method for controlling the fan module of the mask apparatus, and FIG. 19 is a graph illustrating an example of a change in pressure of the breathing space, which is sensed by the pressure sensor.

Referring to FIG. 18, in operation S11, the mask apparatus 1 senses the pressure of the breathing space S through the pressure sensor.

Particularly, when power of the mask apparatus 1 is turned on, the fan modules 16 and 17 operate. Each of the fan modules 16 and 17 rotates at a predetermined RPM to supply external air to the breathing space S of the mask apparatus 1, thereby facilitating breathing.

When the fan modules 16 and 17 operate, the external air can be suctioned into the fan modules 16 and 17 after passing through filter covers 25 and 26 and filters 23 and 24. In addition, the air suctioned into the fan modules 16 and 17 can be introduced into the breathing space S through an air duct 120 and air outlets 129*a* and 129*b*. Then, a user can inhale and exhale the air introduced into the breathing space S.

Here, when the user inhales air inside the breathing space S, a pressure in the breathing space S can decrease. In some examples, when the user exhales air into the breathing space S, a pressure of the breathing space S can increase.

As described above, the pressure in the breathing space S can decrease or increase depending on a user's breathing state (inhalation or exhalation). In some examples, the pressure in the breathing space S can be detected by the pressure sensor 14. Pressure information sensed by the pressure sensor 14 can be provided to a control portion or a control module 18 in real time. For instance, the control module 18 can include a controller, an electrical circuit, or a processor.

The mask apparatus 1 determines a user's breathing pattern based on the sensed pressure (S12).

Particularly, the mask apparatus 1 extracts information on the user's inhalation and exhalation through pressure data sensed through the pressure sensor 14.

For example, as illustrated in FIG. 19, the mask apparatus 1 collects pressure data sensed by the pressure sensor 14 for a predetermined time. The pressure data includes a pressure value measured in real time, and accordingly, a time taken for one time breath (one time inhalation and one time exhalation), i.e., a maximum pressure value and a minimum pressure value for one time breathing cycle and one time breathing can be confirmed.

As described above, when the user inhales air, the air in the breathing space S can be introduced into the user's nose so that the pressure in the breathing space S gradually decreases, and when the user exhales air, the air can be introduced into the breathing space S so that the pressure of the breathing space S gradually increases.

As a result, points A1, A2, and A3 at which the pressure of the breathing space S is the highest are points at which the exhalation is finished, and points B1, B2, and B3 at which the pressure of the breathing space S is the lowest are points at which the inhalation is finished. Therefore, the inhalation starts for a certain time from the points A1, A2, and A3 at which the exhalation is finished, and the exhalation starts for a certain time from the points B1, B2, and B3 at which the inhalation is finished. According to this principle, the control module 18 (or the control portion) of the mask apparatus 1 can predict the user's breathing pattern, i.e., the expected inhalation time points A1, A2, and A3 and the expected exhalation time points B1, B2, and B3.

The mask apparatus 1 determines whether the expected time point for the inhalation arrives (S13). For example, the mask apparatus 1 can determine the user's breathing pattern through the collected pressure data, and determine whether the expected inhalation time points A1, A2, and A3 arrive soon through the breathing pattern.

In some examples, the mask apparatus 1 (e.g., the control module 18) can include a clock device configured to determine a current time, compare the current time with the expected inhalation time points A1, A2, and A3, and determine whether the current time is within a predetermined range from one of the expected inhalation time points A1, A2, and A3. The mask apparatus 1 can be configured to, based on the current time being within the predetermined range from one of the expected inhalation time points A1, A2, and A3, determine that the current time corresponds to or arrives at the one of the expected inhalation time points A1, A2, and A3.

If it is determined that the expected time point of the inhalation arrives, the control module 18 (or the control portion) of the mask apparatus 1 can control the fan module so that the fan module is turned on, or the rotation speed of the fan module increases (S14).

For example, in the mask apparatus 1, the fan modules 16 and 17 can operate to facilitate the user's breathing (inhalation) when the user's expected inhalation time points A1, A2, and A3 arrive to start the user's inhalation.

Alternatively, if the fan modules 16 and 17 are already in operation, the mask apparatus 1 can accelerate the rotation speed RPM of the fan modules 16 and 17 to more facilitate the user's breathing (inhalation) when the user's expected inhalation time points A1, A2, and A3 arrive to start the user's inhalation. Here, each of the fan modules 16 and 17 can rotate in a state in which the rotation speed of the fan modules 16 and 17 increase.

Alternatively, the rotation speed of each of the fan modules 16 and 17 can be varied in proportion to the sensed pressure value. For example, since the pressure values at the predicted inspiration time points A1, A2, and A3 have the largest values, the fan can rotate at a relatively high rotation speed at an initial stage of the inhalation. In some examples, as the inhalation proceeds, the rotation speed of the fan can gradually decrease. That is, when the inhalation predicted time points A1, A2, and A3 arrive, the fan modules 16 and 17 can rotate at a rotation speed in proportion to the current pressure sensed by the pressure sensor 14.

In some implementations, the mask apparatus 1 can determine whether the expected expiration time point arrive (S15). For example, the mask apparatus 1 can determine the user's breathing pattern through the collected pressure data, and determine whether the expected exhalation time points B1, B2, and B3 arrive soon through the breathing pattern.

In some examples, the mask apparatus 1 (e.g., the control module 18) can compare the current time with the expected exhalation time points B1, B2, and B3, and determine whether the current time is within a predetermined range from one of the expected exhalation time points B1, B2, and B3. The mask apparatus 1 can be configured to, based on the current time being within the predetermined range from one of the expected exhalation time points B1, B2, and B3, determine that the current time corresponds to or arrives at the one of the expected exhalation time points B1, B2, and B3.

If it is determined that the expected time point of the exhalation arrives, the control module 18 (or the control portion) of the mask apparatus 1 can control the fan module so that the fan module is turned off, or the rotation speed of the fan module decreases (S16).

For example, in the mask apparatus 1, the operation of the fan modules 16 and 17 can be stopped to facilitate the user's breathing (exhalation) when the user's expected exhalation time points B1, B2, and B3 arrive to start the user's exhalation.

Alternatively, if the fan modules 16 and 17 are accelerated already, the mask apparatus 1 can decelerate the rotation speed RPM (or return to an original rotation speed) of the fan modules 16 and 17 to more facilitate the user's breathing (exhalation) when the user's expected exhalation time points B1, B2, and B3 arrive to start the user's exhalation. Here, each of the fan modules 16 and 17 can rotate in a state in which the rotation speed of each of the fan modules 16 and 17 increase by a predetermined value.

According to this method of controlling the rotation speed of the fan, external air for the user's inhalation can be quickly provided, and the exhalation can be easy so that the user's breathing is stably performed.

The control module 18 of the mask apparatus 1 determines whether a power-off command for the mask apparatus is input (S17), and if the power-off command is input, the operation of the fan module is stopped (S18).

If the power-off command of the mask apparatus is not input, the mask apparatus 1 can proceed to the operation S13 and then repeatedly perform the above-described control method. That is, while the user is in breathing, the rotation speed of the fan module can be accelerated or decelerated repeatedly.

What is claimed is:

1. A mask apparatus comprising:

a mask body including a body front surface and a body rear surface, the body rear surface being configured to cover at least a portion of a user's face;

a fan module disposed at the body front surface;

a mask body cover that is coupled to the mask body and defines an inner space accommodating the fan module;

a seal coupled to the body rear surface and configured to define a breathing space between the mask body and the user's face, where the mask body defines an opening that passes through the mask body and that connects the inner space of the mask body cover to the breathing space;

a pressure sensor disposed in the opening and configured to sense air pressure in the breathing space; and a substrate that is disposed at the body front surface and supports the pressure sensor.

2. The mask apparatus according to claim 1, wherein the substrate covers a front side of the opening.

3. The mask apparatus according to claim 1, further comprising a sensor mounting portion that protrudes from the body front surface and defines a periphery of the opening, wherein a front end of the sensor mounting portion is in contact with and supports a rear surface of the substrate.

4. The mask apparatus according to claim 3, wherein the substrate and the sensor mounting portion are in contact with each other to thereby define a space accommodating the pressure sensor.

5. The mask apparatus according to claim 4, wherein the opening comprises:

a first space that accommodates the pressure sensor; and a second space that connects the first space to the breathing space, and wherein a portion of the sensor mounting portion protrudes from the body front surface in an inclined direction to thereby define the second space at a position below or above the first space.

6. The mask apparatus according to claim 5, wherein a cross-sectional area of the second space decreases along a direction toward the first space.

7. The mask apparatus according to claim 5, wherein a portion of the sensor mounting portion protrudes from the body front surface in an inclined direction, and is configured to convert a flow direction of air introduced into the second space and to guide the air to the first space.

8. The mask apparatus according to claim 1, wherein the fan module comprises:

a first fan module disposed at a first side with respect to a center of the mask body; and a second fan module disposed at a second side with respect to the center of the mask body, and wherein the opening is defined at a position in the mask body between the first fan module and the second fan module.

9. The mask apparatus according to claim 8, further comprising a pair of air ducts disposed at the body front surface and configured to guide external air to the breathing space based on operation of the first fan module and the second fan module.

10. The mask apparatus according to claim 9, wherein the body rear surface defines a pair of air outlets configured to discharge air received through the pair of air ducts to the breathing space, and wherein the opening is defined at a position in the mask body between the pair of air outlets.

11. The mask apparatus according to claim 3, wherein the sensor mounting portion comprises:

a first portion that defines an upper edge of the opening;

a pair of second portions that respectively extend downward from side ends of the first portion and define side edges of the opening; and a third portion that connects the pair of second portions to each other, the third portion being inclined toward the first portion and configured to convert a flow direction of air from the breathing space toward the pressure sensor.

12. A method for controlling the mask apparatus according to claim 1, the method comprising:

sensing, by the pressure sensor, the air pressure in the breathing space of the mask apparatus, the breathing space being configured to face a respiratory organ of the user;

determining a breathing pattern of the user based on the air pressure;

determining expected time points of inhalation and expected time points of exhalation based on the breathing pattern of the user; and varying a rotation speed of the fan module of the mask apparatus based on the expected time points of the inhalation and the expected time points of exhalation.

13. The method according to claim 12, wherein determining the expected time points of inhalation and the expected time points of exhalation comprises:

determining a breathing cycle based on maximum values of the air pressure and minimum values of the air pressure.

14. The method according to claim 13, wherein determining the expected time points of inhalation and the expected time points of exhalation comprises:

determining each of the expected time points of inhalation based on a time point corresponding to one of the maximum values within the breathing cycle, each of the expected time points of inhalation representing a start point of inhalation; and determining each of the expected time points of exhalation based on a time point corresponding to one of the minimum values within the breathing cycle, each of the expected time points of exhalation representing a start point of exhalation.

15. The method according to claim 12, wherein varying the rotation speed of the fan module comprises:

increasing the rotation speed of the fan module based on a current time corresponding to one of the expected time points of inhalation.

16. The method according to claim 12, wherein varying the rotation speed of the fan module comprises:

starting operation of the fan module based on a current time corresponding to one of the expected time points of inhalation.

17. The method according to claim 12, wherein varying the rotation speed of the fan module comprises:

decreasing the rotation speed of the fan module based on a current time corresponding to one of the expected time points of exhalation.

18. The method according to claim 12, wherein varying the rotation speed of the fan module comprises:

stopping operation of the fan module based on a current time corresponding to one of the expected time points of exhalation.

19. The method according to claim 12, wherein varying the rotation speed of the fan module comprises:

based on a current time corresponding to one the expected time points of exhalation, increasing or decreasing the rotation speed of the fan module in proportion to a change of the air pressure sensed by the pressure sensor.

20. A mask apparatus comprising:

a mask body including a body front surface and a body rear surface, the body rear surface being configured to cover at least a portion of a user's face;

a fan module disposed at the body front surface;

a mask body cover that is coupled to the mask body and defines an inner space accommodating the fan module;

a seal coupled to the body rear surface and configured to define a breathing space between the mask body and the user's face, where the mask body defines an opening that passes through the mask body and that connects the inner space of the mask body cover to the breathing space; and a pressure sensor disposed in the opening and configured to sense air pressure in the breathing space, wherein the fan module comprises:

a first fan module disposed at a first side with respect to a center of the mask body; and a second fan module disposed at a second side with respect to the center of the mask body, and wherein the opening is defined at a position in the mask body between the first fan module and the second fan module.

* * * * *